(12) United States Patent
Movsisyan et al.

(10) Patent No.: US 10,623,262 B2
(45) Date of Patent: Apr. 14, 2020

(54) METHODS AND SYSTEMS TO ADJUST A MONITORING TOOL AND AUXILIARY SERVERS OF A DISTRIBUTED COMPUTING SYSTEM

(71) Applicant: VMware, Inc., Palo Alto, CA (US)

(72) Inventors: Vardan Movsisyan, Yerevan (AM); Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 233 days.

(21) Appl. No.: 15/628,369

(22) Filed: Jun. 20, 2017

(65) Prior Publication Data

US 2018/0365044 A1 Dec. 20, 2018

(51) Int. Cl.
*H04L 12/24* (2006.01)
*H04L 12/26* (2006.01)

(52) U.S. Cl.
CPC ...... *H04L 41/0886* (2013.01); *H04L 41/0681* (2013.01); *H04L 41/085* (2013.01); *H04L 41/0816* (2013.01); *H04L 41/0853* (2013.01); *H04L 41/0896* (2013.01); *H04L 43/00* (2013.01); *H04L 41/046* (2013.01); *H04L 41/0893* (2013.01); *H04L 41/12* (2013.01); *H04L 43/08* (2013.01); *H04L 43/16* (2013.01)

(58) Field of Classification Search
CPC ............. H04L 41/0681; H04L 41/0886; H04L 41/0816; H04L 41/0896; H04L 41/0893; H04L 41/046; H04L 43/08; H04L 43/16; G06F 2009/45595
See application file for complete search history.

(56) References Cited

U.S. PATENT DOCUMENTS

| | | | | |
|---|---|---|---|---|
| 8,397,242 | B1* | 3/2013 | Conover | G06F 8/52 718/1 |
| 2004/0128370 | A1* | 7/2004 | Kortright | H04L 41/082 709/221 |
| 2007/0003023 | A1* | 1/2007 | Rolia | H04L 43/00 379/32.01 |
| 2010/0306767 | A1* | 12/2010 | Dehaan | G06F 9/5077 718/1 |

(Continued)

*Primary Examiner* — Lance Leonard Barry

(57) ABSTRACT

Methods and systems adjust resources and monitoring configuration of a monitoring tool and auxiliary servers of a distributed computing system. Any new virtual object installed in the distributed computing system or change in functionality of an existing virtual object of the distributed computing system is identified. Expected configuration rules and resource allocation rules are determined for the virtual object. The expected configured rules are used to adjust a monitoring configuration of the monitoring tool. The resource allocation rules are used to adjust the infrastructure resources available to the monitoring tool. When the virtual object creates a change in demand for auxiliary services, corresponding auxiliary servers are installed, removed, or changed in the distributed computing system. Resource allocated rules and expected configuration rules are determined for the auxiliary servers and used to adjust the infrastructure resources and monitoring configuration of the monitoring tool. Methods optimize distributions of virtual objects.

39 Claims, 42 Drawing Sheets

(56) References Cited

U.S. PATENT DOCUMENTS

| | | | |
|---|---|---|---|
| 2012/0284768 A1* | 11/2012 | Sabin | H04L 63/0428 726/1 |
| 2013/0332430 A1* | 12/2013 | Margalit | G06F 11/3476 707/695 |
| 2015/0039764 A1* | 2/2015 | Beloglazov | H04L 47/70 709/226 |
| 2015/0288592 A1* | 10/2015 | Baughman | H04L 43/16 709/224 |
| 2016/0373405 A1* | 12/2016 | Miller | H04L 63/0236 |
| 2018/0095855 A1* | 4/2018 | Sanakkayala | G06F 9/45558 |

* cited by examiner log.write([[$Time_date] [Thread-$X/$IP/INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [$Time_date] Repair session $RS for range $range finished)

FIG. 15

[2015-03-10 23:43:36.859+0000] [Thread-1822496/127.0.0.1 INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range (-6899937477723537626, -6896547230076663429) finished]

FIG. 16

METHODS AND SYSTEMS TO ADJUST A MONITORING TOOL AND AUXILIARY SERVERS OF A DISTRIBUTED COMPUTING SYSTEM

TECHNICAL FIELD

The present disclosure is directed to adjusting resources, monitoring configuration of a monitoring tool and auxiliary services of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

Server computers of a distributed computing system are typically used to run application programs called "servers" that provide software services for other application programs called "clients." Servers are typically run in virtual objects, such as virtual machines and containers, of the distributed computing system. Servers may share data or resources among many clients, perform computational tasks for clients, or provide services requested by clients. A web server is an example of an application program that serves requested web pages or files to web clients that may be web browsers. When a new virtual object is added to a distributed computing system or the functionality of a server changes, such as adding a database service to a Web server, network traffic typically increases and the demand for resources, such as processing power, memory, and data storage, also increases. A monitoring tool that monitors events created by a new virtual object is not configured to monitor events created by the new virtual object or change in functionality of the server. Currently, system administrators manually reconfigure resources of the monitoring tool to accommodate increased flow of metric created by the new virtual object or changes to services. But such manual changes are time consuming, error prone, and increase costs.

SUMMARY

Methods described herein are directed to automatically adjusting resources and monitoring configuration of a monitoring tool and adjusting auxiliary servers of a distributed computing system in response to n=w virtual objects and change in functionalities of virtual objects. In one aspect, a new virtual object installed in the distributed computing system or change in functionality of an existing virtual object of the distributed computing system is identified. Expected configuration rules and resource allocation rules are determined for the virtual object. The expected configured rules are used to adjust the monitoring configuration of the monitoring tool. The resource allocation rules are used to adjust the infrastructure resources available to the monitoring tool. When the virtual object creates a change in demand for auxiliary services, corresponding auxiliary servers are installed, deleted, or changed in the distributed computing system. Resource allocated rules and expected configuration rules are determined for the auxiliary servers and used to adjust the infrastructure resources and monitoring configuration of the monitoring tool. Methods include optimizing a distribution of virtual objects of a logical application by migrating certain virtual objects to create an equal distribution of functionalities at the server computers used to run the logical application.

DESCRIPTION OF THE DRAWINGS

FIG. 15 shows an example of a log write instruction.

FIG. 16 shows an example of an event message generated by a log write instruction.

DETAILED DESCRIPTION

Figure 1:
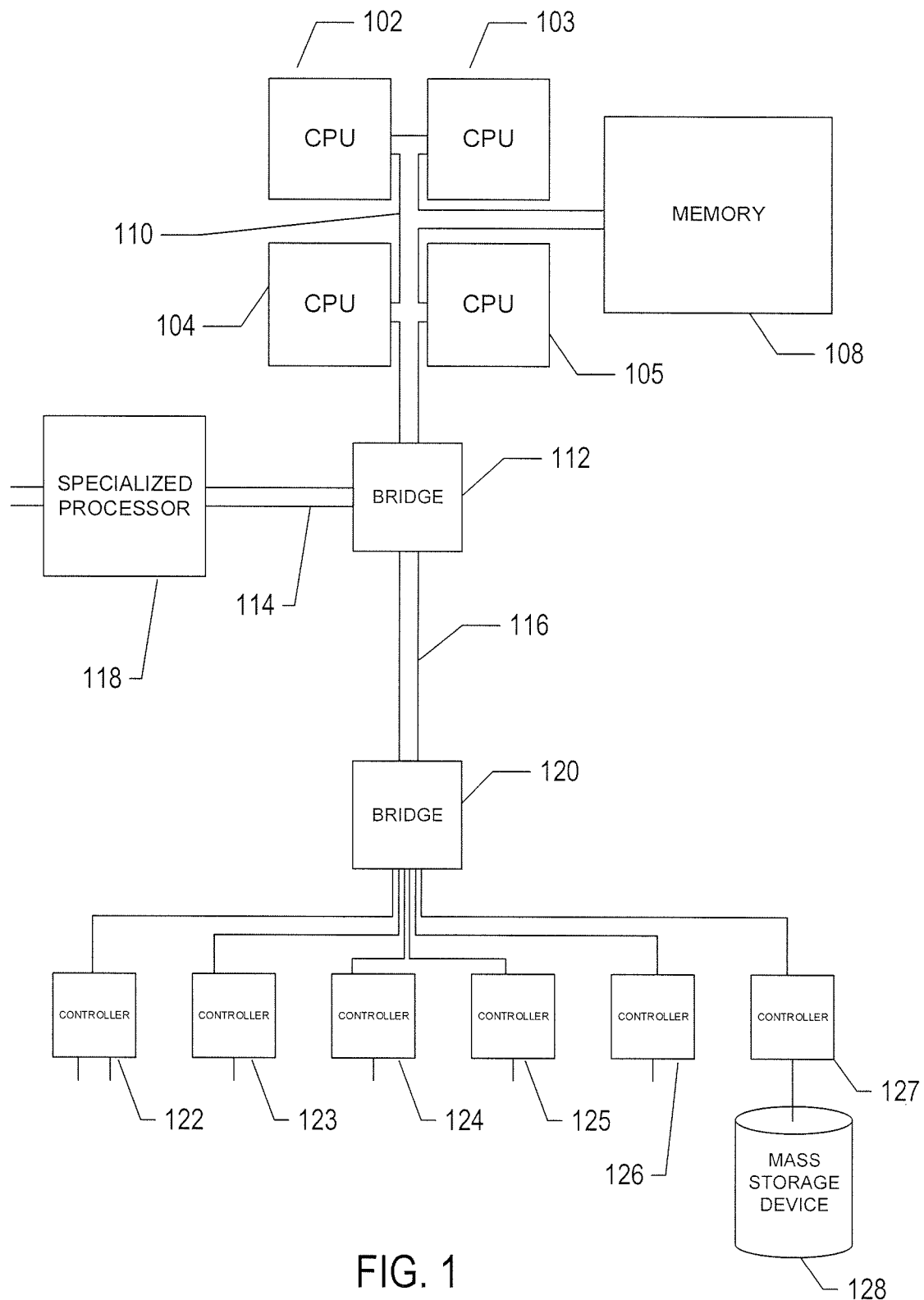
FIG. 1 shows a general architectural diagram for various types of computers.

This disclosure presents computational methods and systems to monitor and adjust resources of a distributed computing in response to changes in services. In a first subsection, computer hardware, complex computational systems, and virtualization are described. Containers and containers supported by virtualization layers are described in a second subsection. Logging event messages in event logs is described in a third subsection. Methods to adjust resource usage and monitoring configuration of a monitoring tool and adjust auxiliary services of a distributed computing system are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
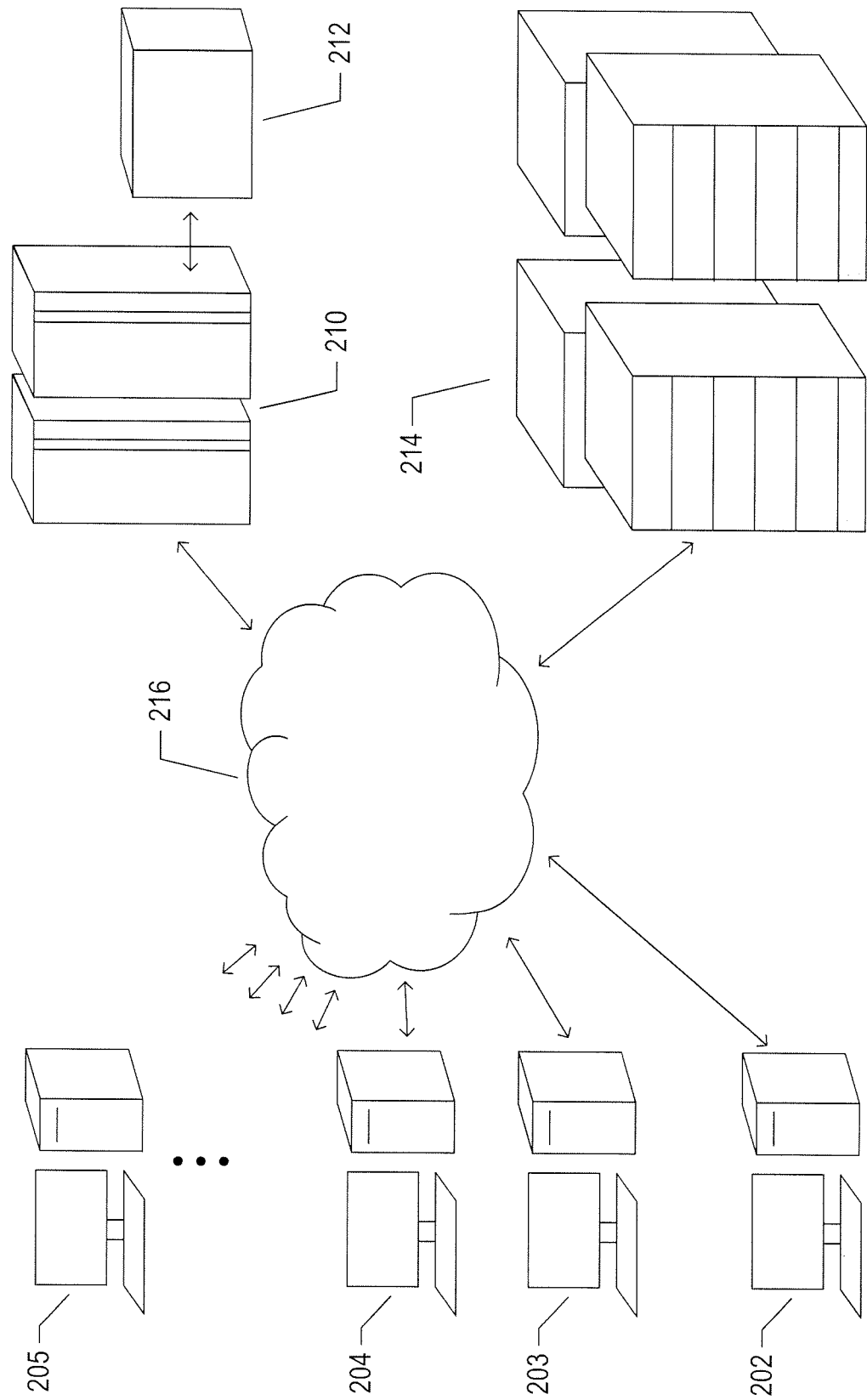
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
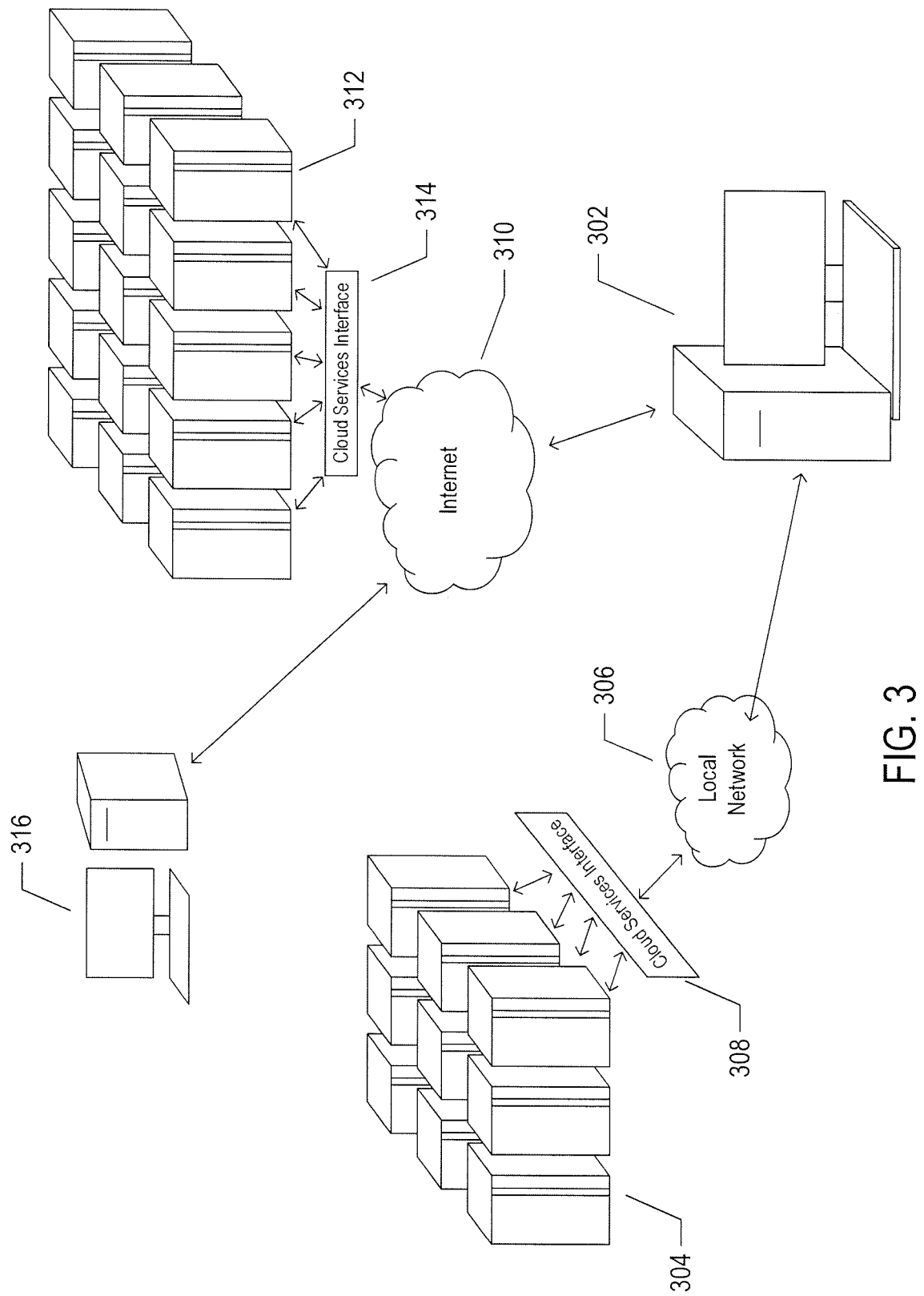
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
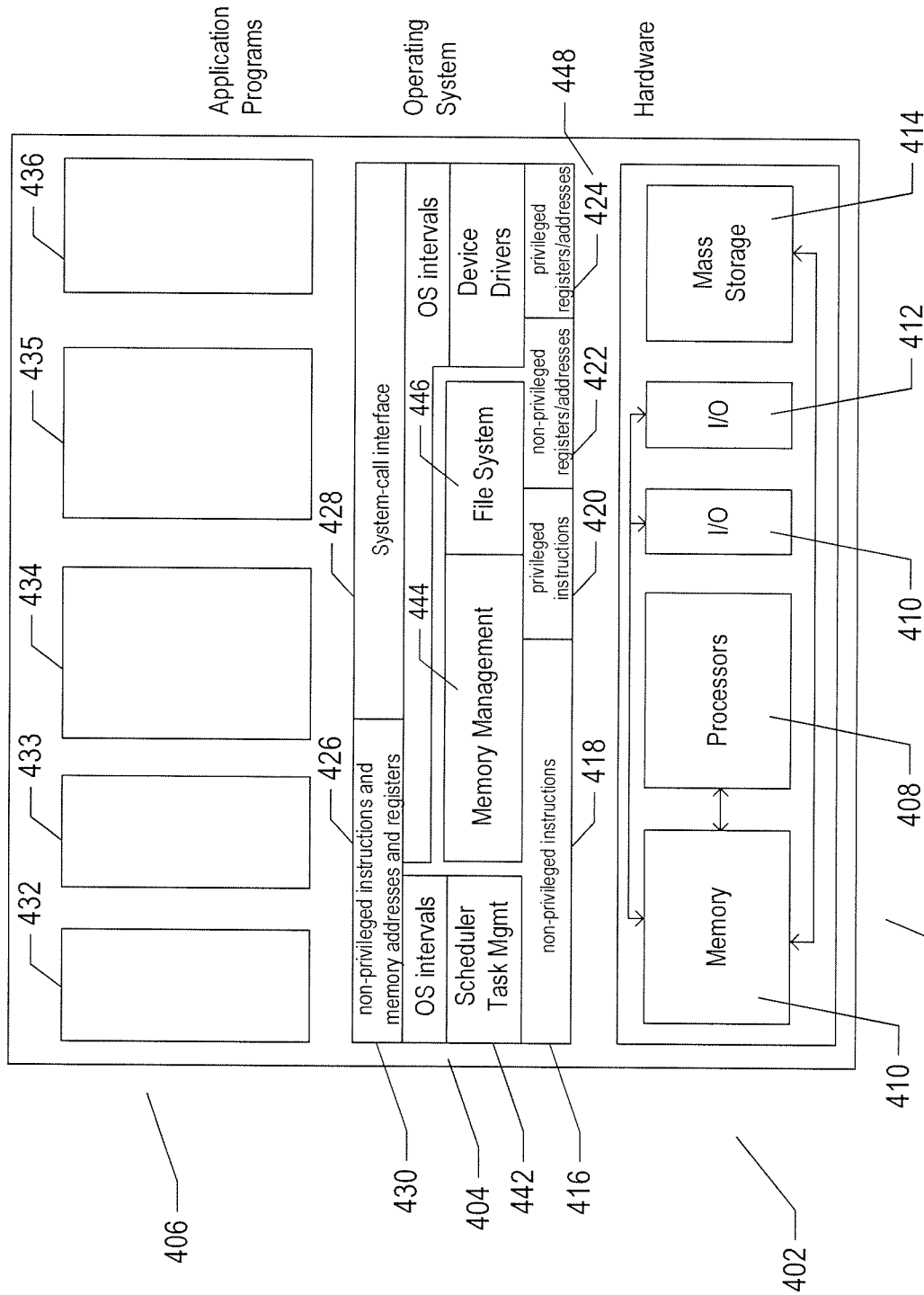
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
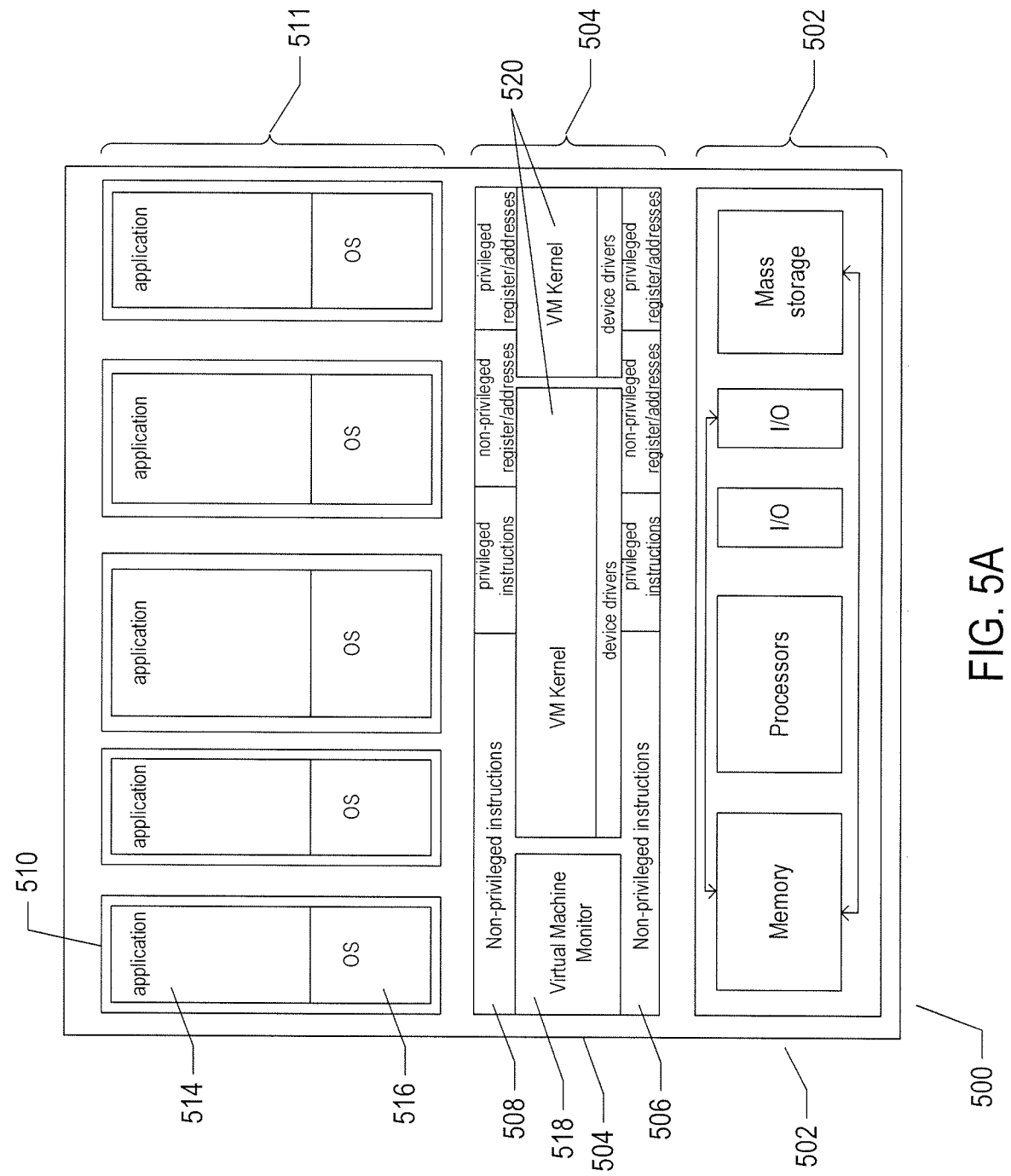
FIGS. 5A-5B show two types of virtual machine ("VM") and VM execution environments.
Figure 5B:
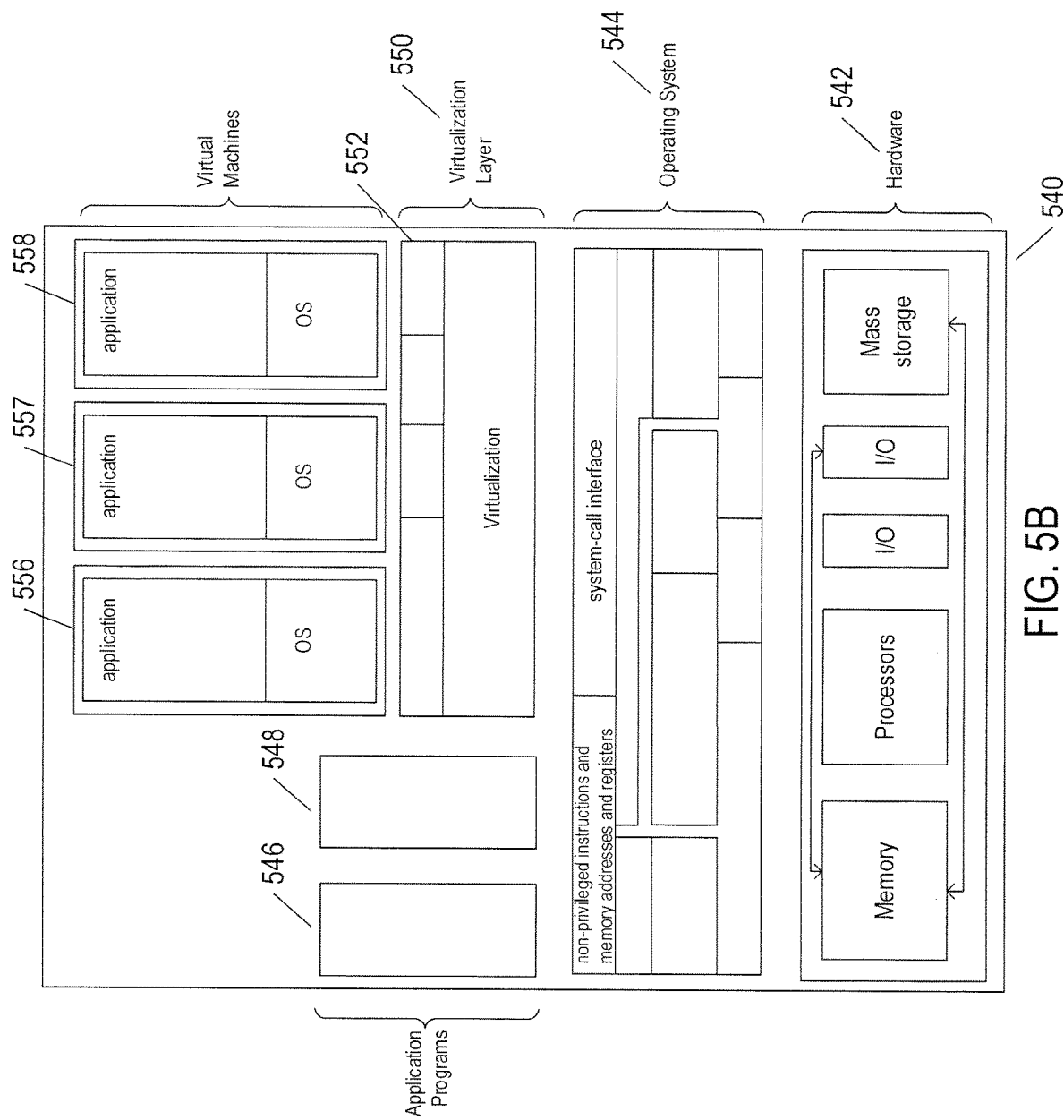

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. Figure SA shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
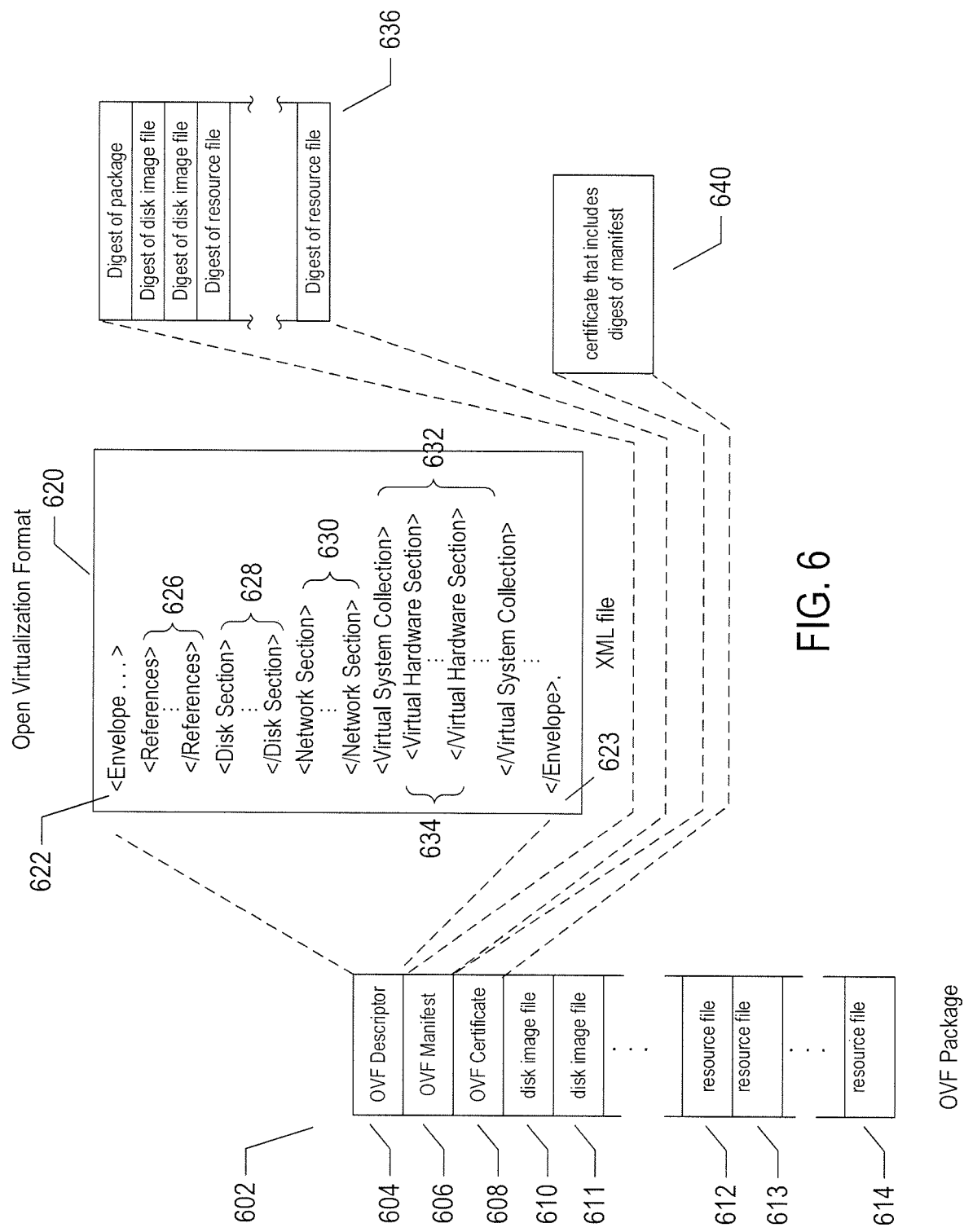
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
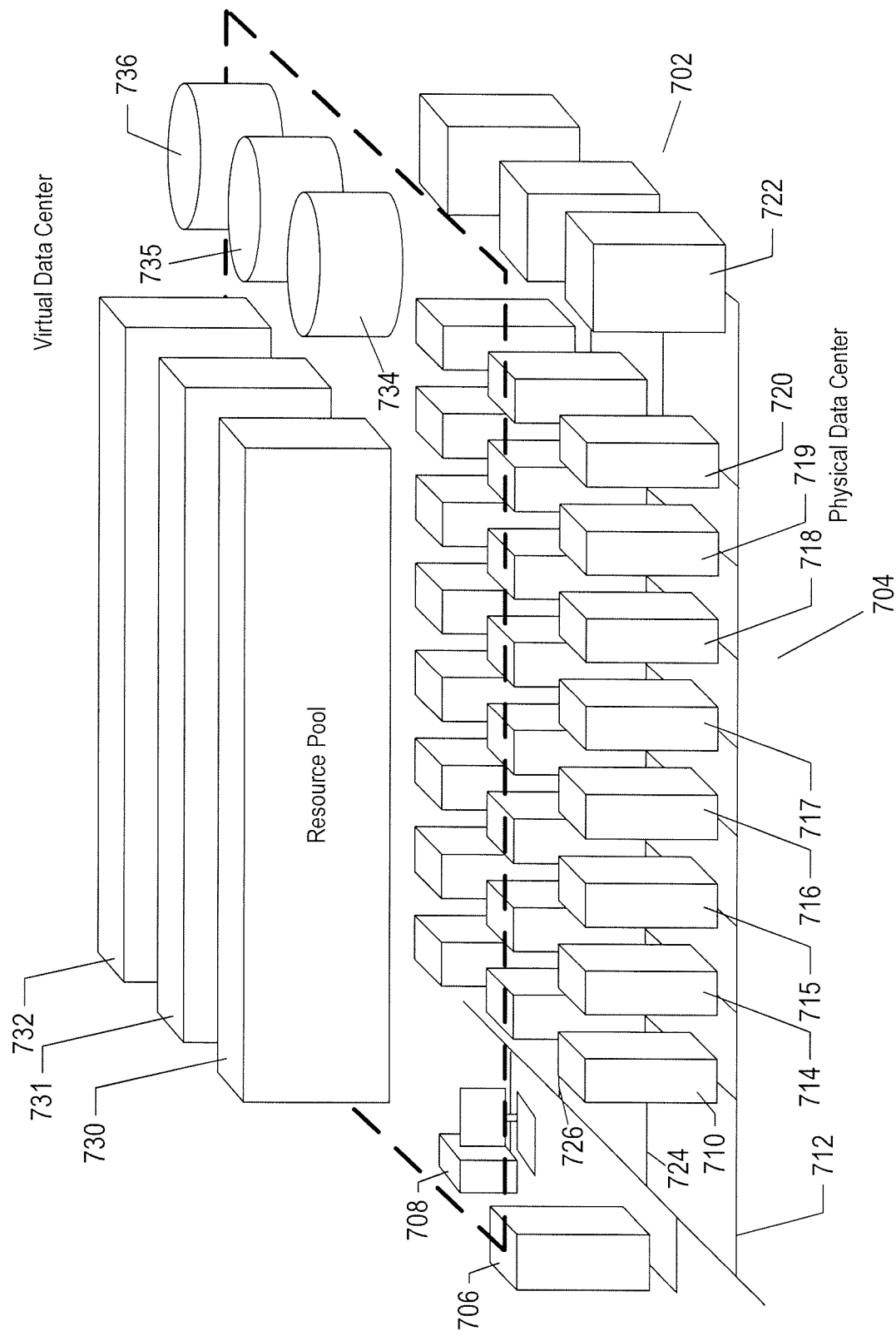
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
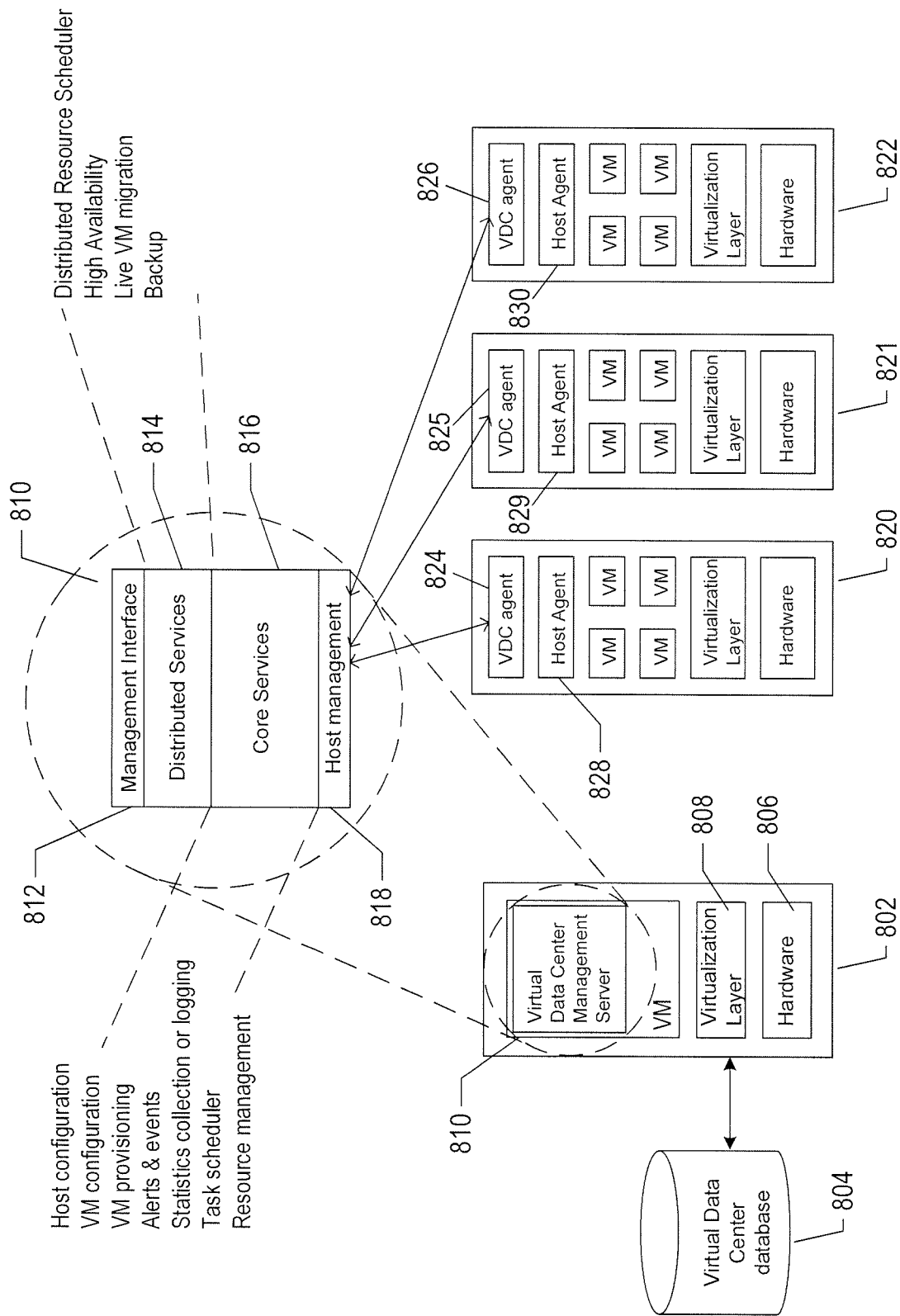
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-330 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
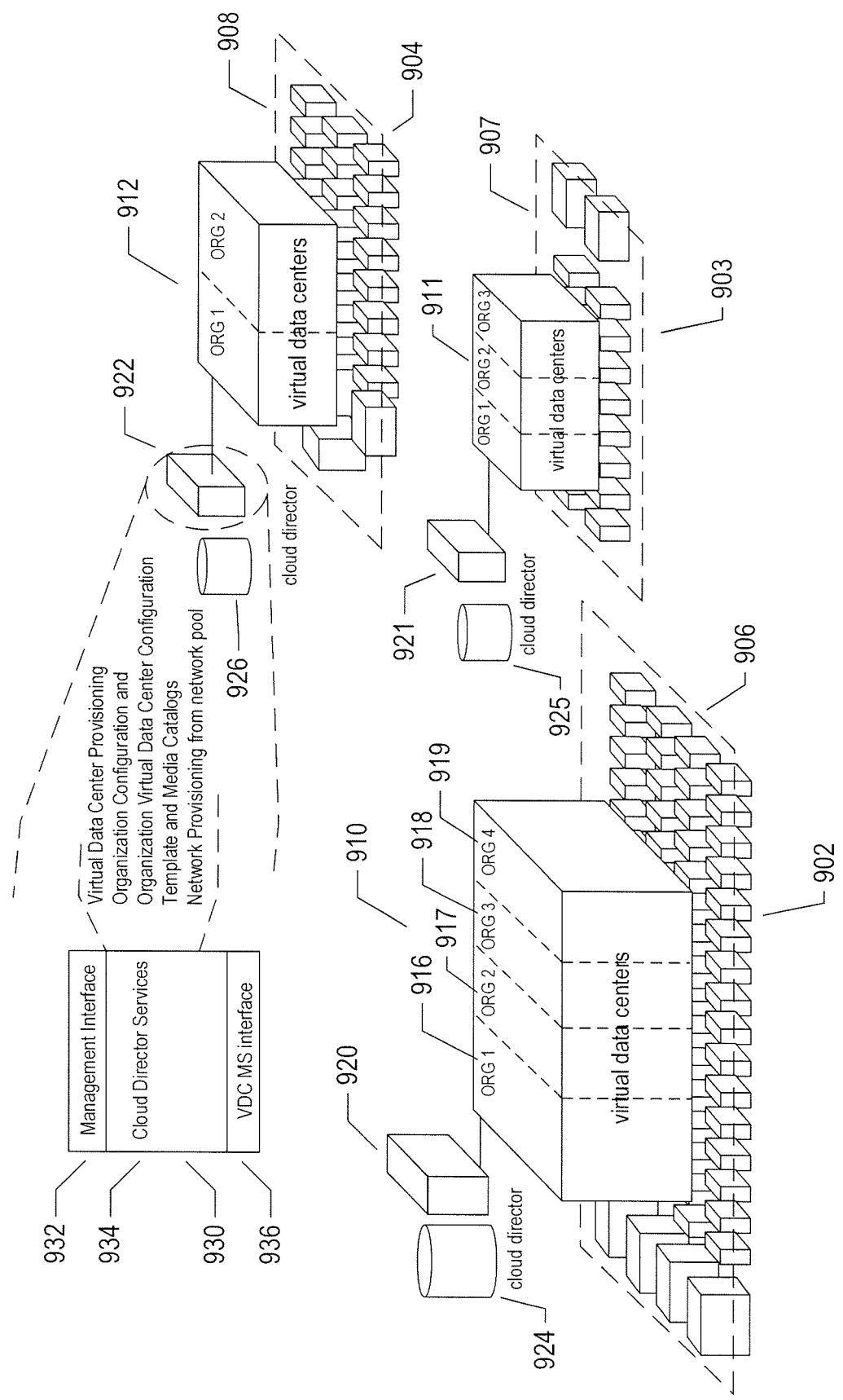
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliances significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
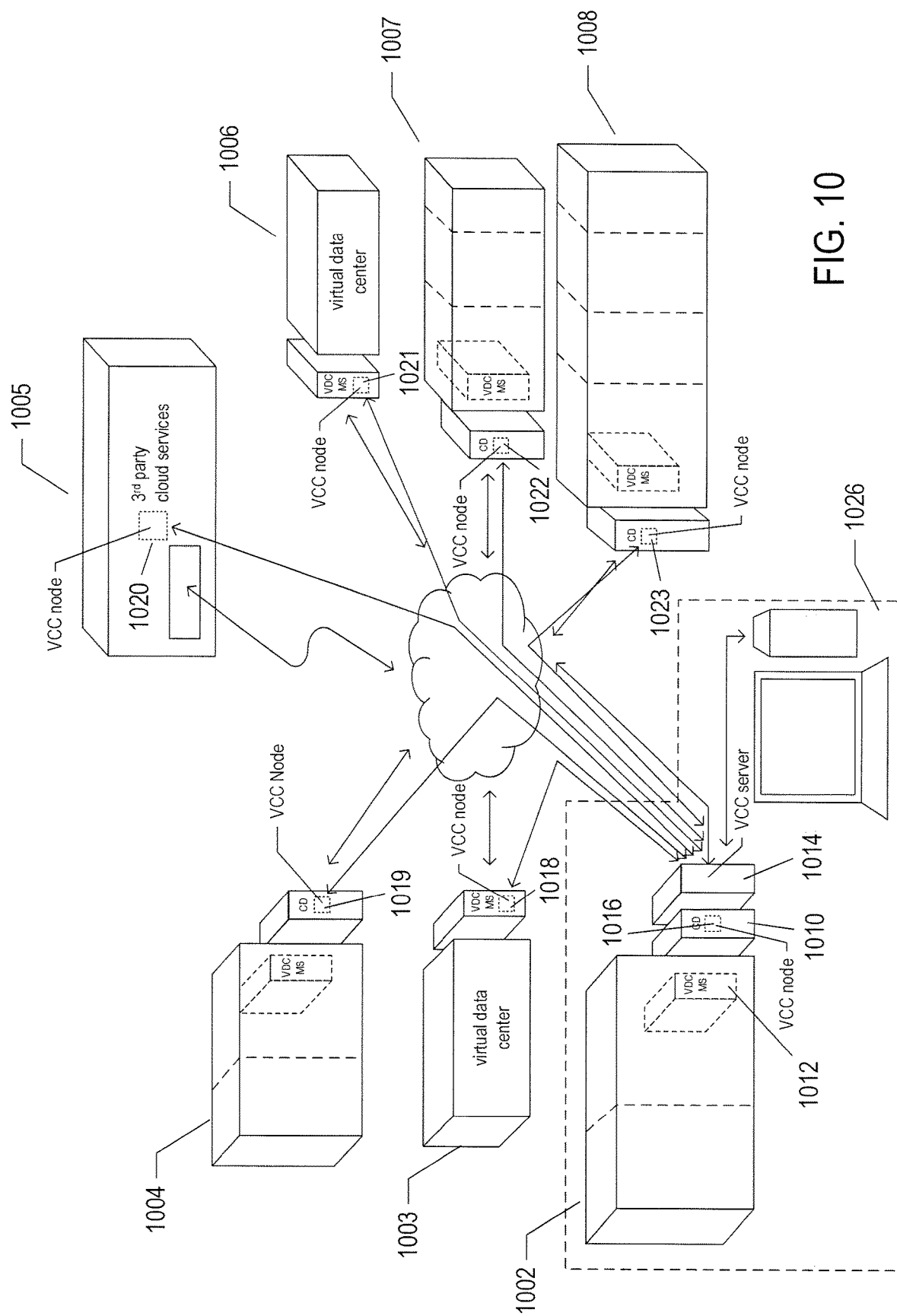
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, operating-system-level ("OSL") virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
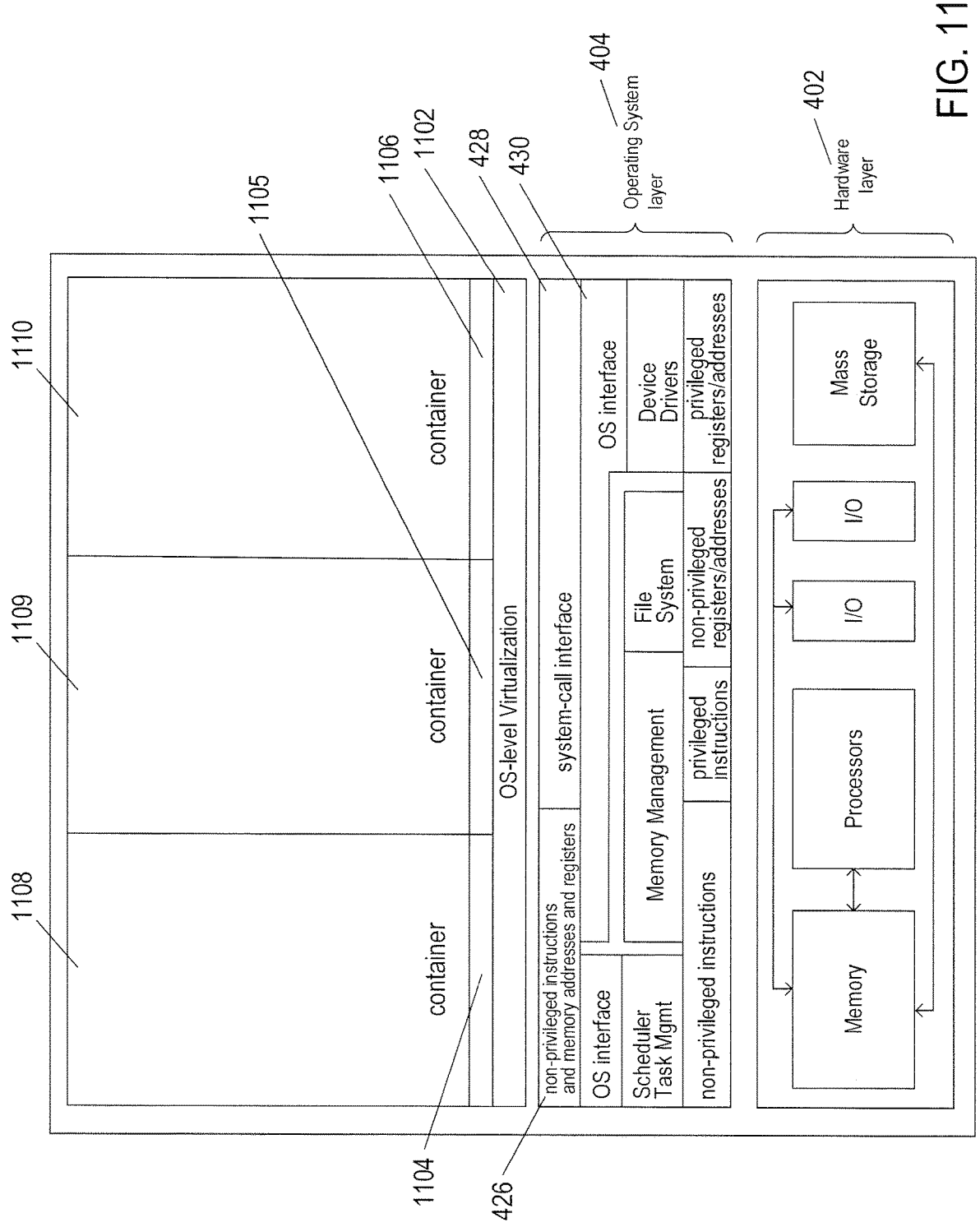
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
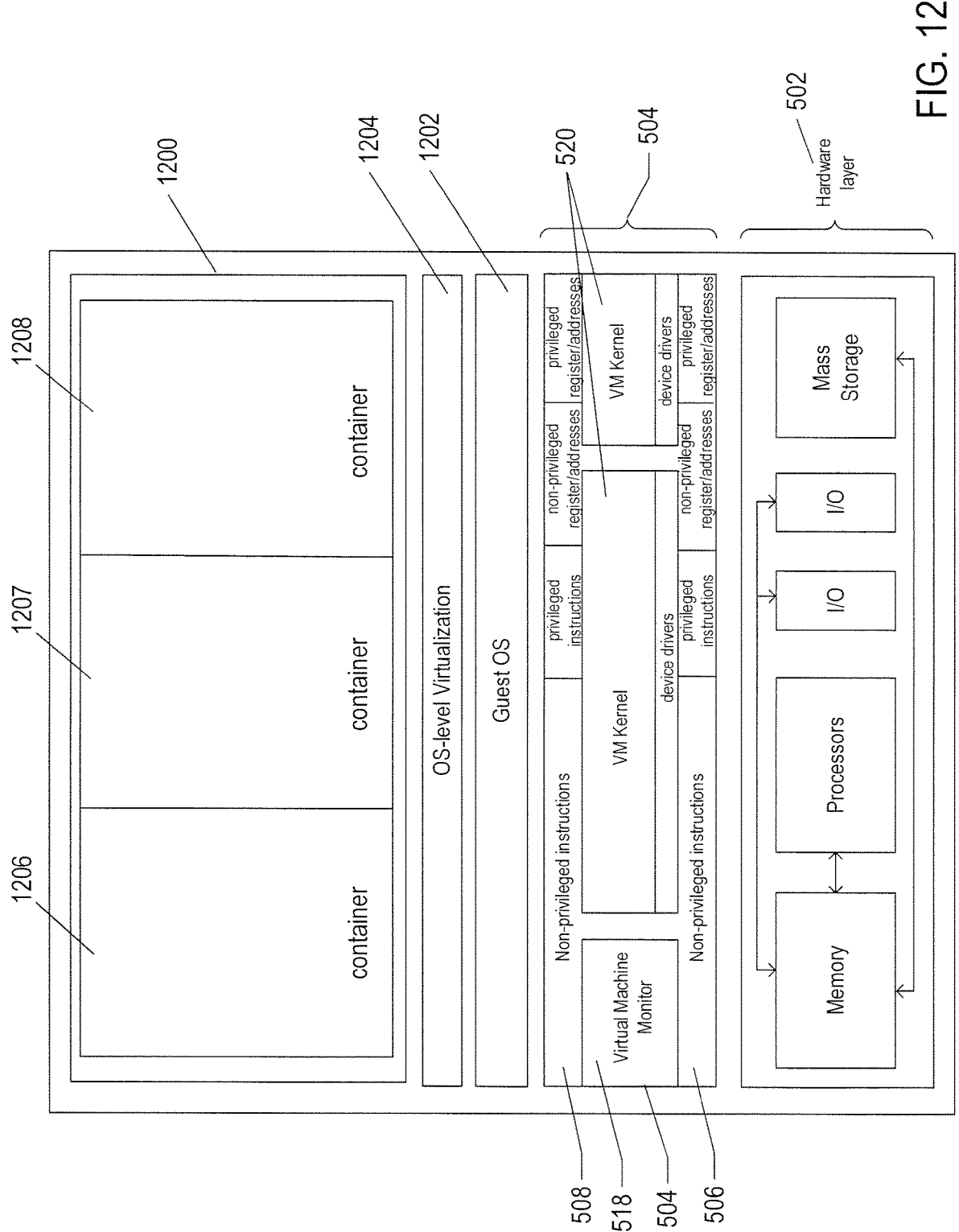
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Event Messages in Event Logs

Figure 13:
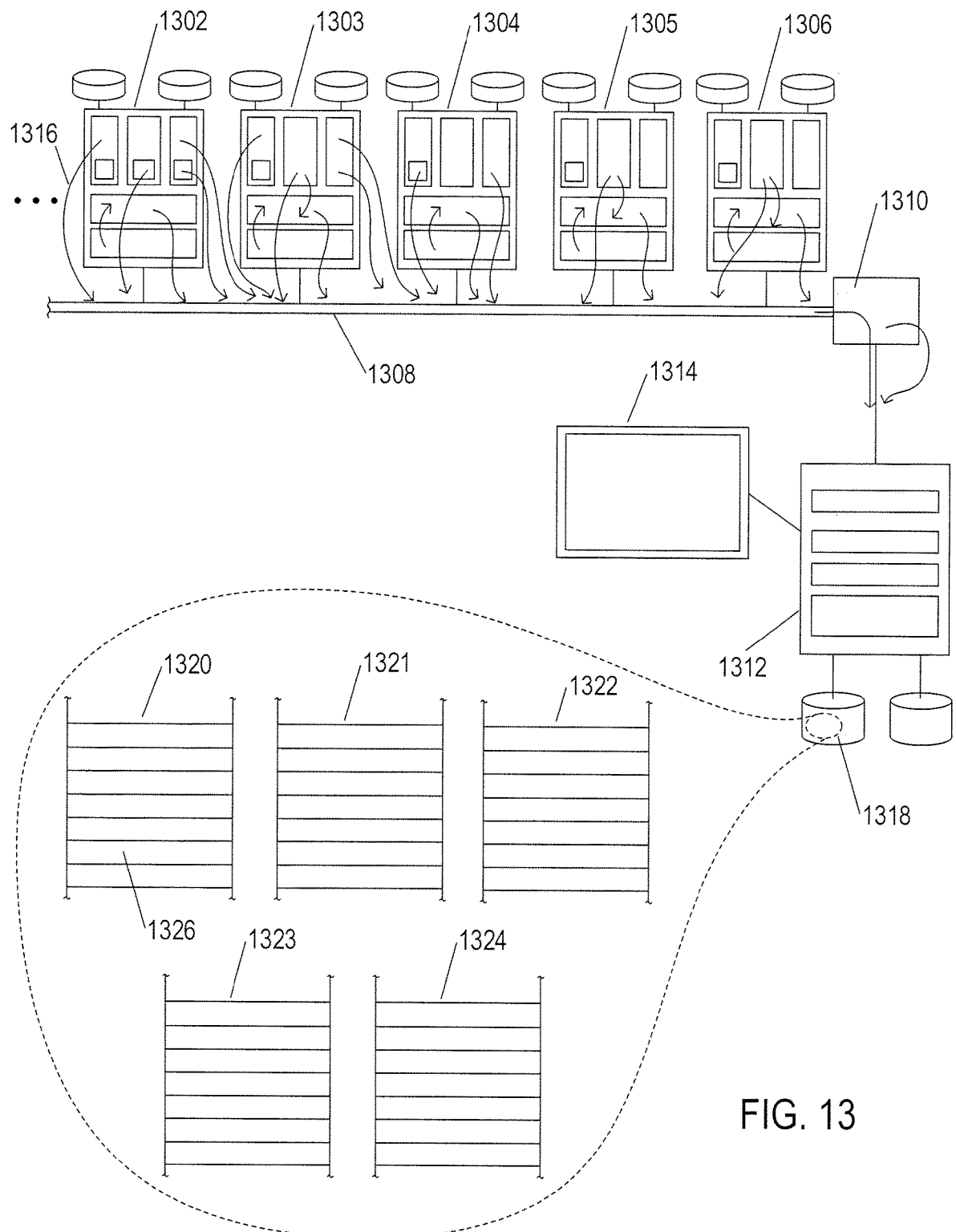
FIG. 13 shows an example of logging event messages in event logs.

FIG. 13 shows an example of logging event messages in event logs. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. One or more of the computer systems 1302-1306 may run a log monitoring agent that collects and forwards event messages to a log management server that runs on the administration console 1314. As indicated by curved arrows, such as curved arrow 1316, multiple components within each of the discrete computer systems 1302-1306 as well as the communications bridge/router 1310 generate event messages that are forwarded to the log management server. Event messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Event messages may be collected at various hierarchical levels within a discrete computer system and then forwarded to the log management server in the administration computer 1312. For example, a log monitoring agent may collect and forward the event messages at various hierarchical levels. The log management server in the administration computer 1312 collects and stores the received event messages in a data-storage device or appliance 1318 as event logs 1320-1324. Rectangles, such as rectangle 1326, represent individual event messages. For example, event log 1320 may comprise a list of event messages generated within the computer system 1302. Each log monitoring agent has an agent monitoring configuration that includes a log path and a log parser. The log path specifies a unique file system path in terms of a directory tree hierarchy that identifies the storage location of an event log associated with the event source on the administrative console 1314 or the data-storage device or appliance 1318. The log monitoring agent receives specific file and event channel log paths to monitor event logs and the log parser includes log parsing rules to extract and format lines of event message into event message fields. The log monitoring agent then sends the constructed structured event messages to the log management server. The administrative console 1314 and computer systems 1302-1306 can function without log management agents and a log management server, but with less precision and certainty.

Figure 14:
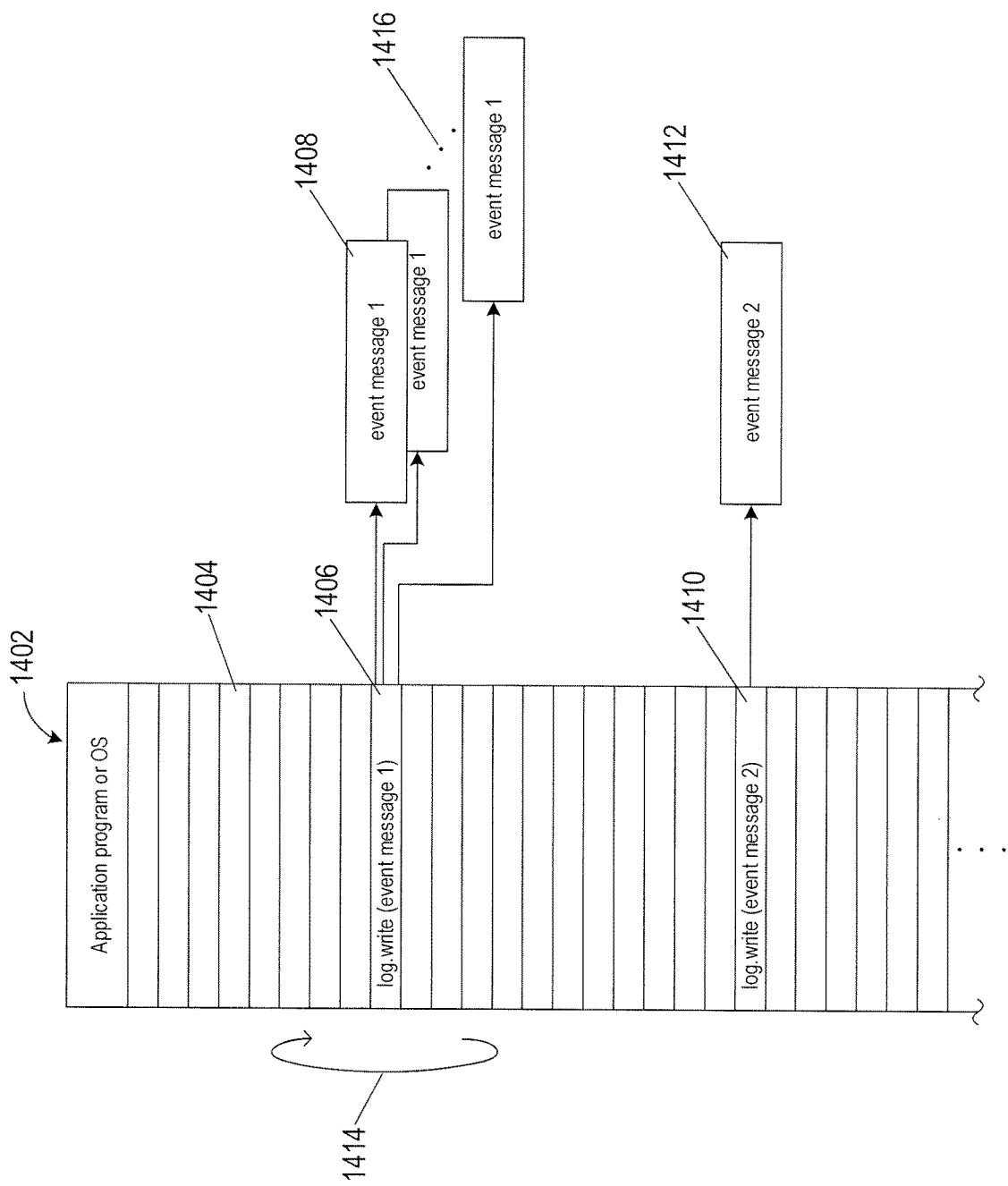
FIG. 14 shows an example of a source code with log write instructions.

FIG. 14 shows an example of a source code 1402 of an application program, an operating system, a VM, a guest operating system, or any other computer program or machine code. The source code 1402 is just one example of an event source that generates event messages. Rectangles, such as rectangle 1404, represent a definition, a comment, a statement, or a computer instruction that expresses some action to be executed by a computer. The source code 1402 includes log write instructions that generate event messages when certain events predetermined by the developer occur during execution of the source code 1402. For example, source code 1402 includes an example log write instruction 1406 that when executed generates an "event message 1" represented by rectangle 1408, and a second example log write instruction 1410 that when executed generates "event message 2" represented by rectangle 1412. In the example of FIG. 14, the log write instruction 1408 is embedded within a set of computer instructions that are repeatedly executed in a loop 1414. As shown in FIG. 14, the same event message 1 is repeatedly generated 1416. The same type of log write instructions may also be located in different places throughout the source code, which in turns creates repeats of essentially the same type of event message in the event log.

In FIG. 14, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. In the example of FIG. 15, the log write instruction 1502 includes arguments identified with "$" For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as "Repair session" 1508. The text strings between brackets "[ ]" represent file-system paths, such as path 1510. When the log write instruction 1502 is executed, parameters are assigned to the arguments and the text strings and natural-language words and phrases are stored as an event message in an event log.

FIG. 16 shows an example of an event message 1602 generated by the log write instruction 1502. The arguments of the log write instruction 1502 may be assigned numerical parameters that are recorded in the event message 1602 at the time the event message is written to the event log. For example, the time stamp 1504, thread 1505, and IP internet protocol ("IP") address 1506 of the log write instruction 1502 are assigned corresponding numerical parameters 1604-1606 in the event message 1602. The time stamp 1604, in particular, represents the date and time the event message is generated. The text strings and natural-language words and phrases of the log write instruction 1502 also appear unchanged in the event message 1602 and may be used to identify the type of event that occurred during execution of the application program or operating system.

Figure 17:
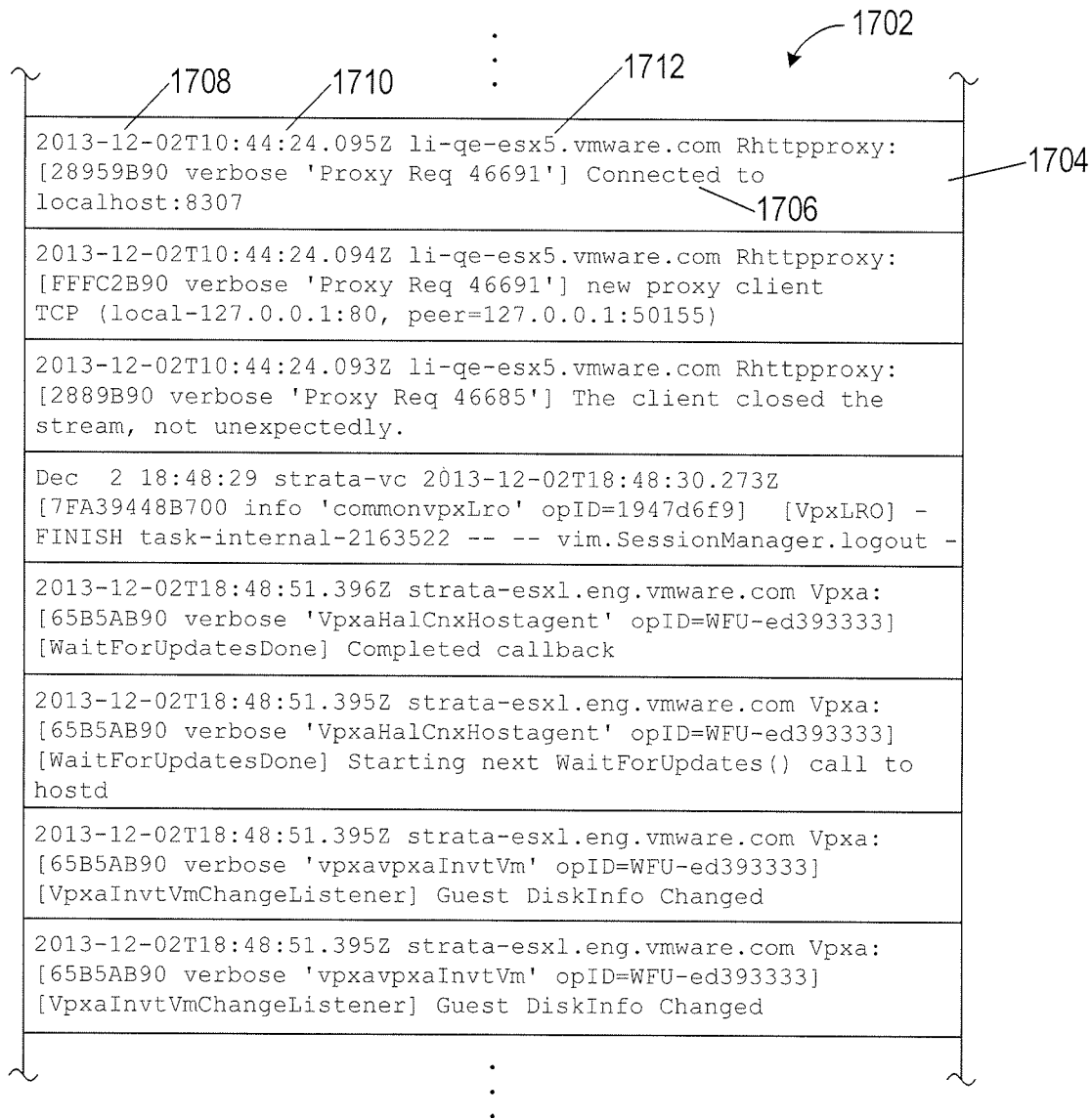
FIG. 17 shows a small, eight-entry portion of an event log.

As event messages are received from various event sources, the event messages are stored in the order in which the event messages are received. FIG. 17 shows a small, eight-entry portion of an event log 1702. In FIG. 17, each rectangular cell, such as rectangular cell 1704, of the portion of the event log 1702 represents a single stored event message. For example, event message 1702 includes a short natural-language phrase 1706, date 1708 and time 1710 numerical parameters, as well as, an alphanumeric parameter 1712 that appears to identify a particular host computer.

Figure 18:
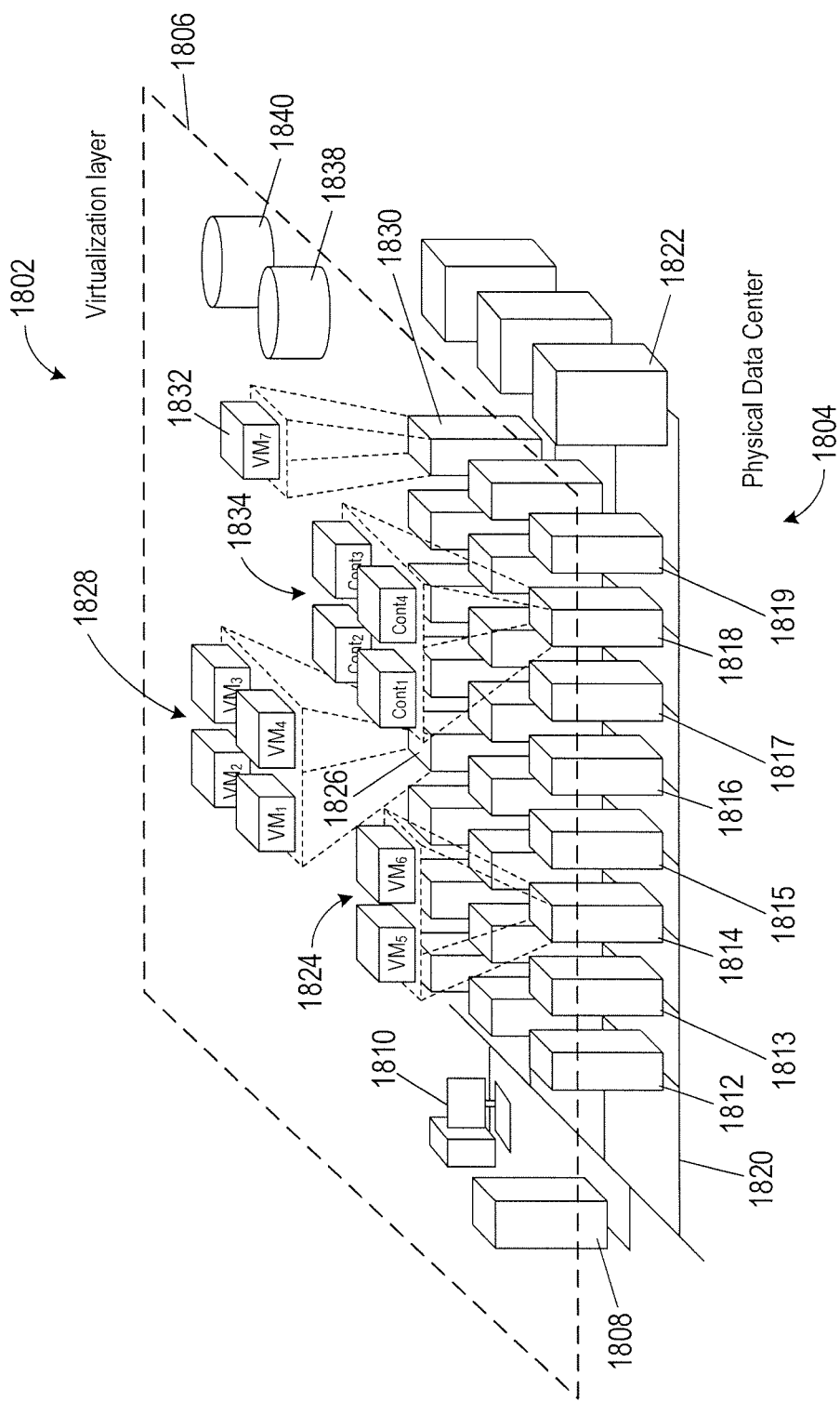
FIG. 18 shows an example of a virtualization layer located above a physical data center.

Methods to Adjust Resources and Monitoring Configuration of a Monitoring Tool and Adjust Auxiliary Services of a Distributed Computing System FIG. 18 shows an example of a virtualization layer 1802 located above a physical data center 1804. The virtualization layer 1802 is separated from the physical data center 1804 by a virtual-interface plane 1806. The physical data center 1804 comprises a management server computer 1808 and any of various computers, such as PC 1810, on which a virtual-data-center management interface may be displayed to system administrators and other users. The physical data center 1804 additionally includes many server computers, such as server computers 1812-1819, that are coupled together by local area networks, such as local area network 1820, that directly interconnects server computers 1812-1819 and a mass-storage array 1822. The physical data center 1804 includes three local area networks that each directly interconnects a bank of eight server computers and a mass-storage array. Different physical data centers may include many different types of computers, networks, data-storage systems and devices connected according to many different types of connection topologies. The virtualization layer 1802 includes virtual objects, such as VMs and containers, hosted by the server computers in the physical data center 1804. Certain server computers host VMs as described above with reference to FIGS. 5A-5B. For example, server computer 1814 hosts two VMs 1824, server computer 1826 hosts four VMs 1828, and server computer 1830 hosts a VM 1832. Other server computers may host containers as described above with reference to FIGS. 11 and 12. For example, server computer 1818 hosts four containers 1834. The virtual-interface plane 1806 abstracts the physical data center 1804 to one or more VDCs comprising the virtual objects and one or more virtual data stores, such as virtual data stores 1838 and 1840, and one or more virtual networks. For example, one VDC may comprise VMs 1828 and virtual data store 1838 and another VDC may comprise VMs 1824 and virtual data store 1840.

Figure 19A:
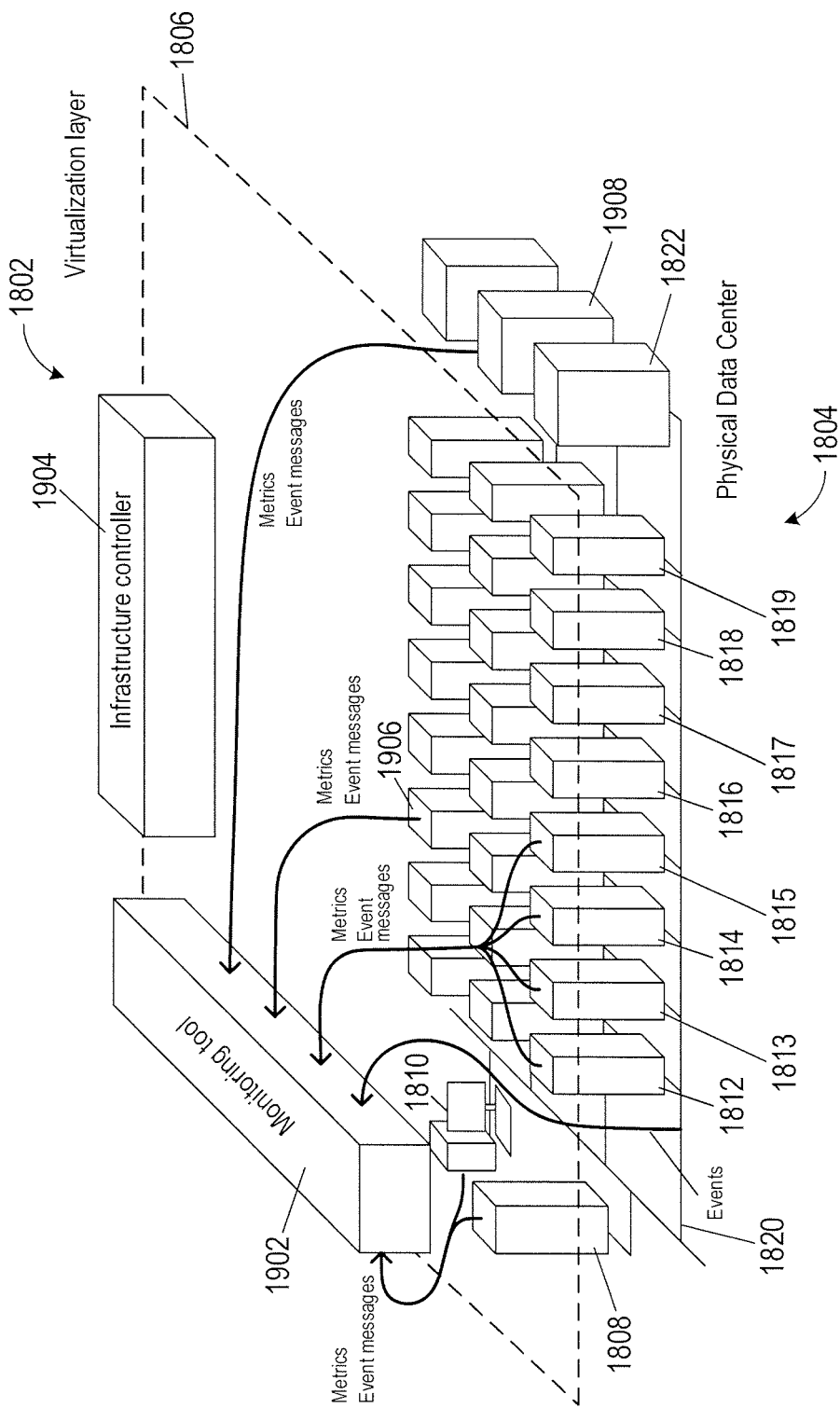
FIGS. 19A-19B show a monitoring tool and an infrastructure controller abstracted to a virtualization layer.
Figure 19B:
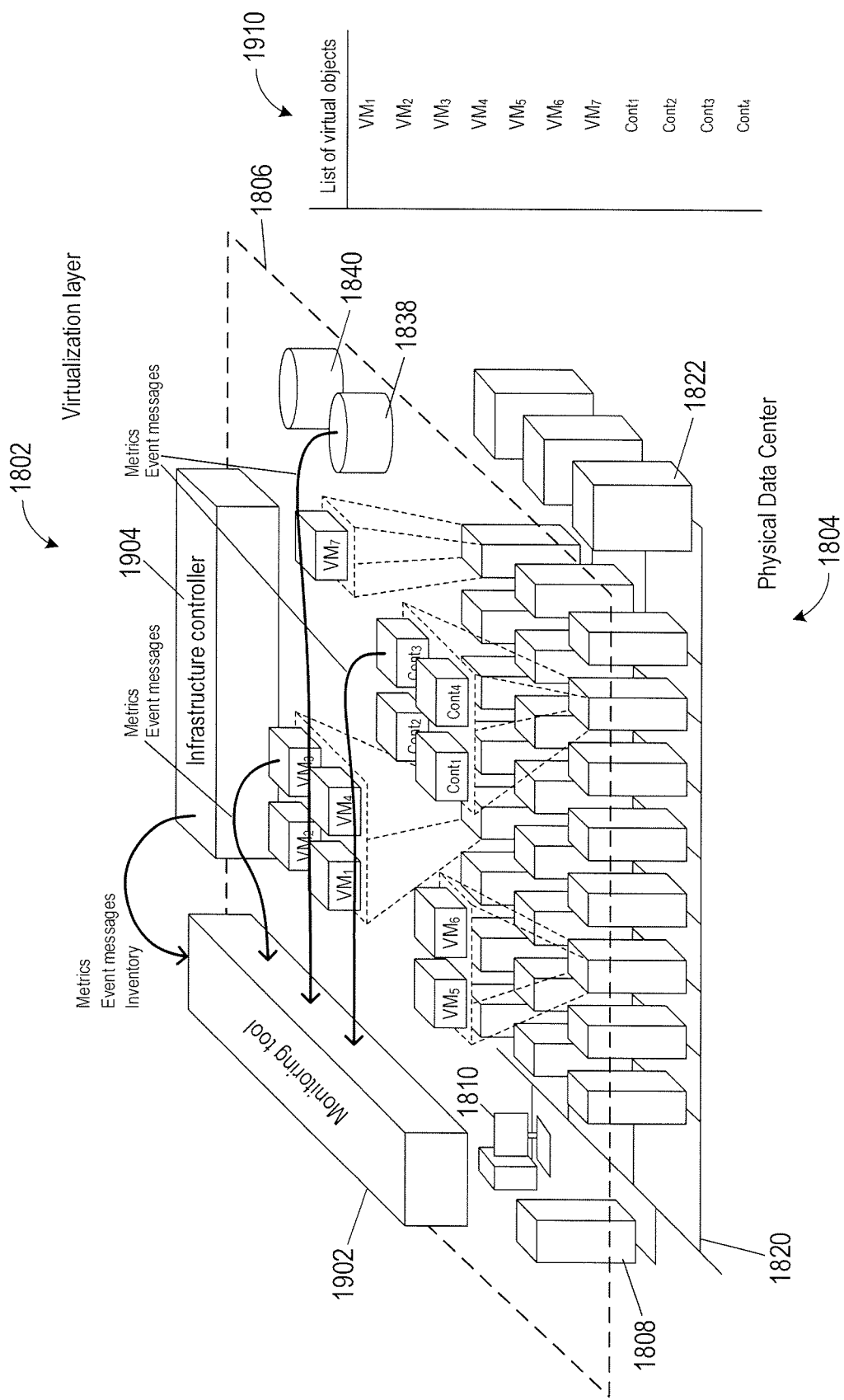

FIGS. 19A-19B show a monitoring tool 1902 and an infrastructure controller 1904 abstracted to the virtualization layer 1802. The monitoring tool 1902 and infrastructure controller 1904 are hosted by the management server computer 1808. The monitoring tool 1902 includes an information technology ("IT") operations management server, such as VMware's vRealize® Operations™, and a log management server. The IP operations management server monitors, usage, performance, and capacity of physical resources of each computer system, data-storage device, server computer and other components of the physical data center 1804. The physical resources include, but are not limited to, processors, memory, network connections, and storage of each computer system, mass-storage devices, and other components of the physical data center 1804. The IP operations management server monitors physical resources by collecting time series metric data, such as CPU usage, amount of memory, network throughput, network traffic, and amount of storage. CPU usage is a measure of CPU time used to process instructions of an application program or operating system as a percentage of CPU capacity. High CPU usage may be an indication of usually large demand for processing power, such as when an application program enters an infinite loop. Amount of memory is the amount of memory (e.g., GBs) a computer system uses at a given time. The log management server receives event messages sent by various log monitoring agents that run on the physical or virtual objects of the distributed computing system 1804 and receives event messages directly from event sources running on physical or virtual objects without log monitoring agents. The monitoring tool 1902 processes the metric data and the event messages and generates instructions to migrate VMs from one server computer to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executed on multiple physical computer systems so that the services provided by the virtual appliance are continuously accessible, even when one of the multiple virtual appliances becomes compute bound, data-access bound, suspends execution, or fails. The log management server maintains event logs of the massive amounts of event messages generated by various VMs, containers, and operating systems running in the physical data center 1804.

As shown in FIGS. 19A-19B, directional arrows represent metric data and event messages sent from physical and virtual objects of the physical data center 1804 to the monitoring tool 1902. In FIG. 19A, PC 1810, server computers 1808 and 1906, and mass-storage array 1908 send metric data and event messages to the monitoring tool 1902. Network events, such as network throughput and network traffic, of each component of the physical data center 1804 may also be sent to the monitoring tool 1902. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. Clusters of server computers may also send metric data and event messages to the monitoring tool 1902. For example, a cluster of server computers 1812-1815 sends cluster metric data and event messages to the monitoring tool 1902. In FIG. 19B, metric data and event messages are sent from the VMs, containers, virtual storage, and the infrastructure controller 1904 to the monitoring tool 1902. The infrastructure controller 1904 also sends metric data, event messages, an inventory and configuration of the physical resources of the physical data center 1804.

The monitoring tool 1902 includes a centralized repository, or directory, of virtual objects running in the distributed computing system 1804. The centralized repository is a database component of the monitoring tool 1902 and is used to dynamically maintain a list of virtual objects, versions, revisions and configurations of each application program running in the virtual objects of the distributed computing system. For example, FIG. 19B shows a table 1910 that represents a list of the virtual objects maintained by the central repository. The centralized repository contains a list of virtual objects by name, version, configuration, source, and dependencies. Each virtual object in the list of virtual objects and includes an IP address and may include a corresponding fully qualified domain name ("FQDN") assigned to the virtual object. The IP address is used to access the virtual object. The FQDN is a unique name assigned to the virtual object. For example, the DNS translates the FQDN into the IP address so the virtual object may be accessed. The monitoring tool 1902 generates API commands that are sent to the infrastructure controller 1904 to execute appropriate action to accommodate changes that are expected to result from installing and removing a virtual object and changing the functionality of a virtual object, such as changing the functionality of a server that runs in a VM.

Figure 20:
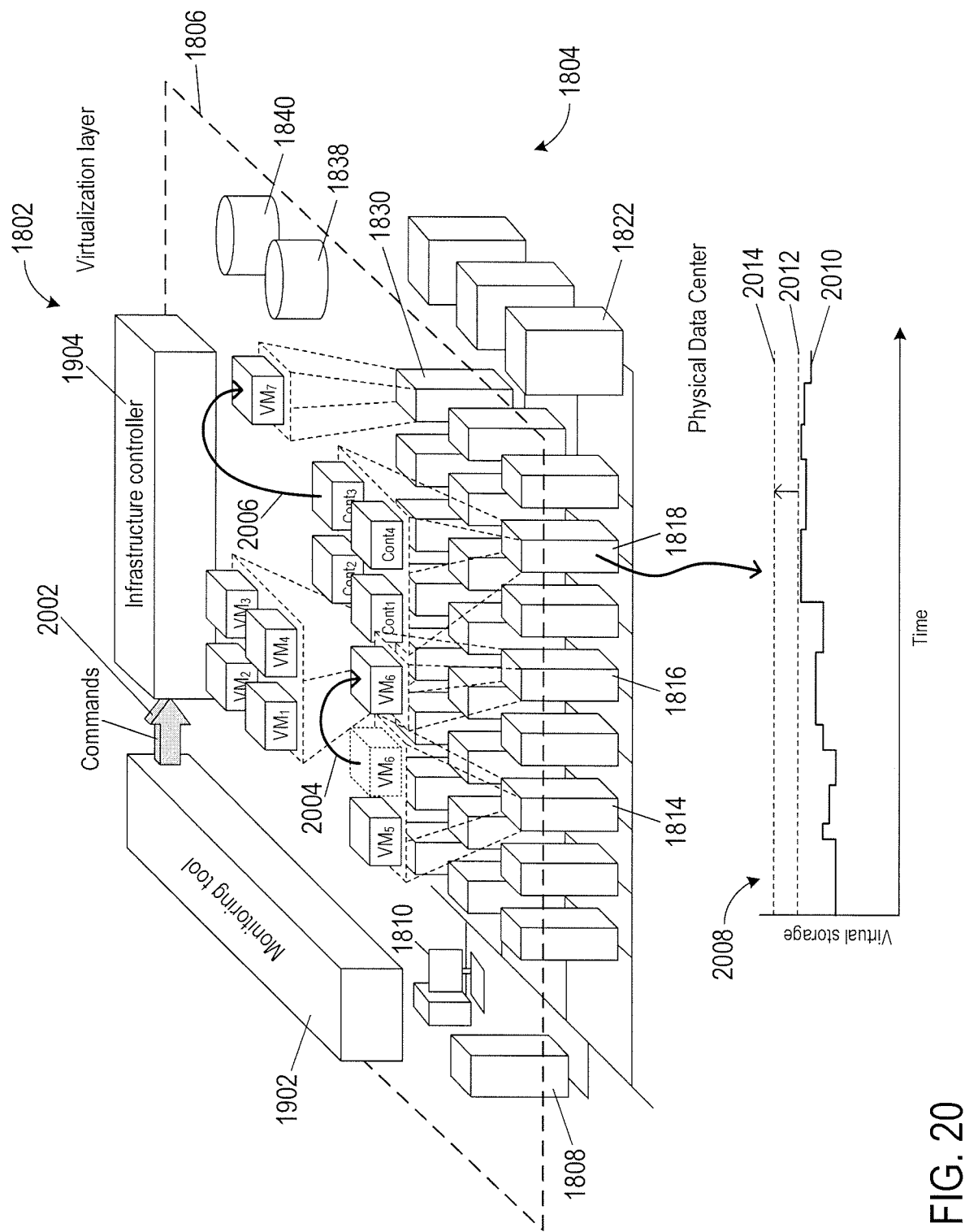
FIG. 20 shows an example of commands sent from a monitoring tool to a infrastructure controller.

The monitoring tool 1902 uses the centralized repository, event messages, and metric data to identify new virtual objects and changes to the functionality of existing VMs and containers and generates API commands to make changes to the virtualization layer. FIG. 20 shows API commands 2002 sent from the monitoring tool 1902 to the infrastructure controller 1904. API commands 2002 include, but are not limited to, installing a content pack, moving hosts from one cluster to another cluster, migrating VMs from a server computer to another server compute, migrating a container to a VM, moving an application from a container to a VM, resizing virtual data storage, adjusting CPU usage by VMs, adjusting available memory and storage for VMs, and adding network firewall rules between VMs. In the example of FIG. 20, the API commands 2002 include migrating 2004 the VM denoted by $VM_6$ from the server computer 1814 to the server computer 1816 and migrating 2006 an application program from a container denoted by $Cont_3$ running on the server computer 1818 to the VM denoted by $VM_7$ running on the server computer 1830 used by virtual objects running on the server computer 1818. FIG. 20 also shows a plot 2008 of a virtual storage metric 2010 for the virtual data storage 1838. Dashed line 2012 represents the virtual storage limit. The monitoring tool 1902 may generate an API command that is sent to the infrastructure controller 1904 to increase the virtual storage limit 2012 to a new virtual storage limit 2014 in response to the virtual storage metric 2010 approaching the limit 2012.

The monitoring tool 1902 uses rules to determine an expected impact on infrastructure resources and monitoring configuration of the monitoring tool 1902 and the management server computer 1808 in response to installation of new virtual objects to the distributing computing system 1804 and to changes in functionality of existing virtual objects running in the distributed computing system 1804.

Figure 21:
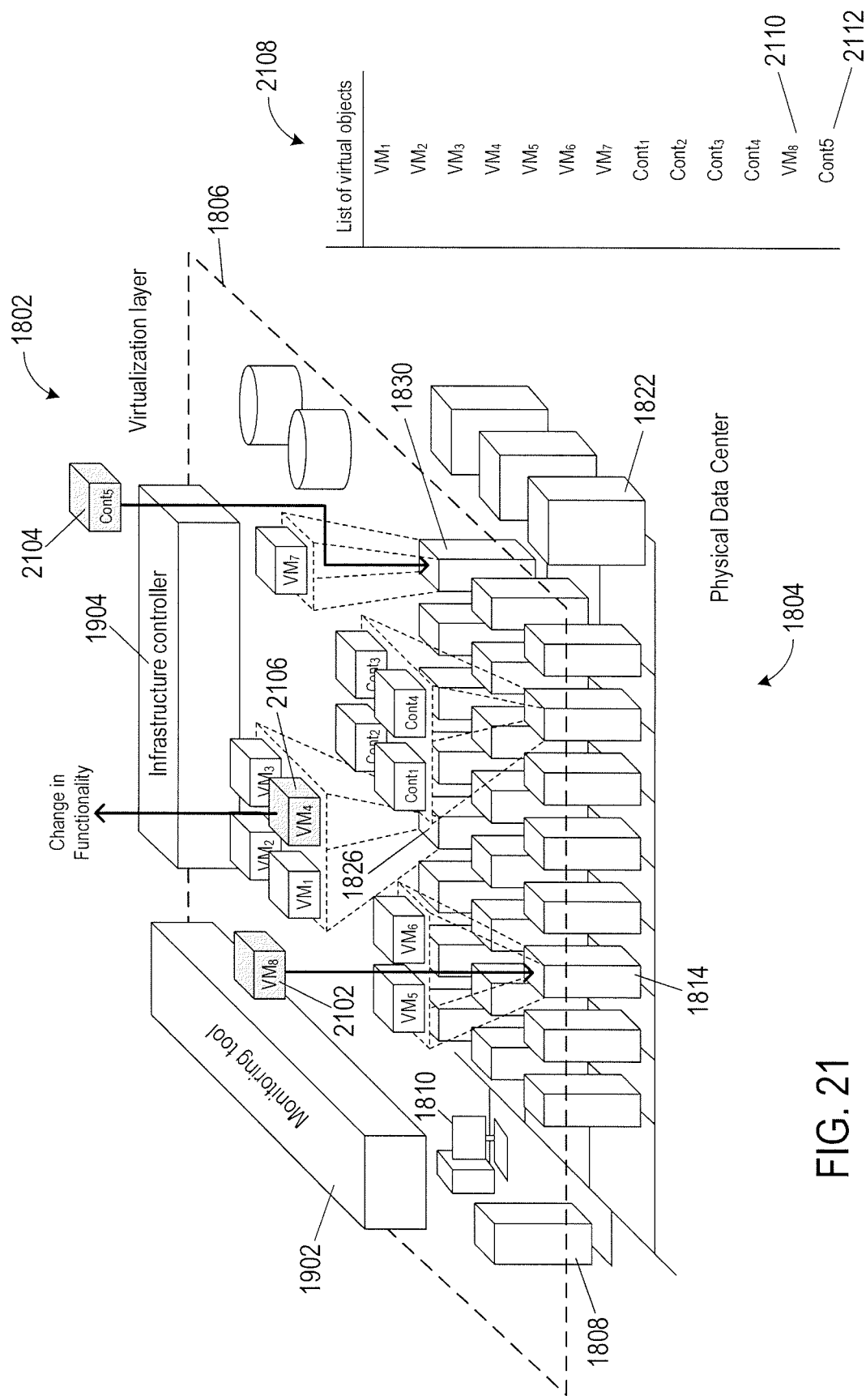
FIG. 21 shows an example of two virtual objects installed on server computers and a change in functionality of a virtual object.

FIG. 21 shows an example of two virtual objects 2102 and 2104 installed on server computers 1814 and 1818 of the distributed computing system 1804 and a change in functionality of a virtual object 2106. In particular, a VM denoted by $VM_8$ is installed on the server computer 1814, a container denoted by $Cont_5$ is installed on the server computer 1830. The functionality of the VM denoted by $VM_4$ is changed. For example, suppose $VM_4$ runs a Web server application program. The functionality of $VM_4$ is a web server that provides web services to clients. Now suppose a database server has been added to $VM_4$. The functionality of $VM_4$ has changed from strictly web server to web services plus database server. The functionality of $VM_4$ may also be changed by uninstalling the web server and installing the database server, which is a change in functionality of $VM_4$.

Detection of installed or uninstalled virtual objects may be determined from repeated examination of the list of virtual objects maintained by the centralized repository. For example, in FIG. 21, when the virtual objects $VM_8$ and $Cont_5$ are installed on corresponding server computers 1814 and 1830, the list of virtual objects 2108 maintained by the central repository is updated to include entries 2110 and 2112. For example, the virtual objects $VM_8$ and $Cont_5$ have IP addresses and FQDNs. The monitoring tool 1902 may periodically compare the list of virtual objects with the list of virtual objects at a previous time to identify and changes to the list. For example, the monitoring tool 1902 may use the IP address or FQDN of each virtual object to compare the updated list of virtual objects 2108 with the previous list of virtual objects 1910 to identify the recently installed virtual objects $VM_8$ and $Cont_5$. Alternatively, the centralized repository may proactively report any updates to the list of virtual objects to the monitoring tool 1902.

Figure 22:
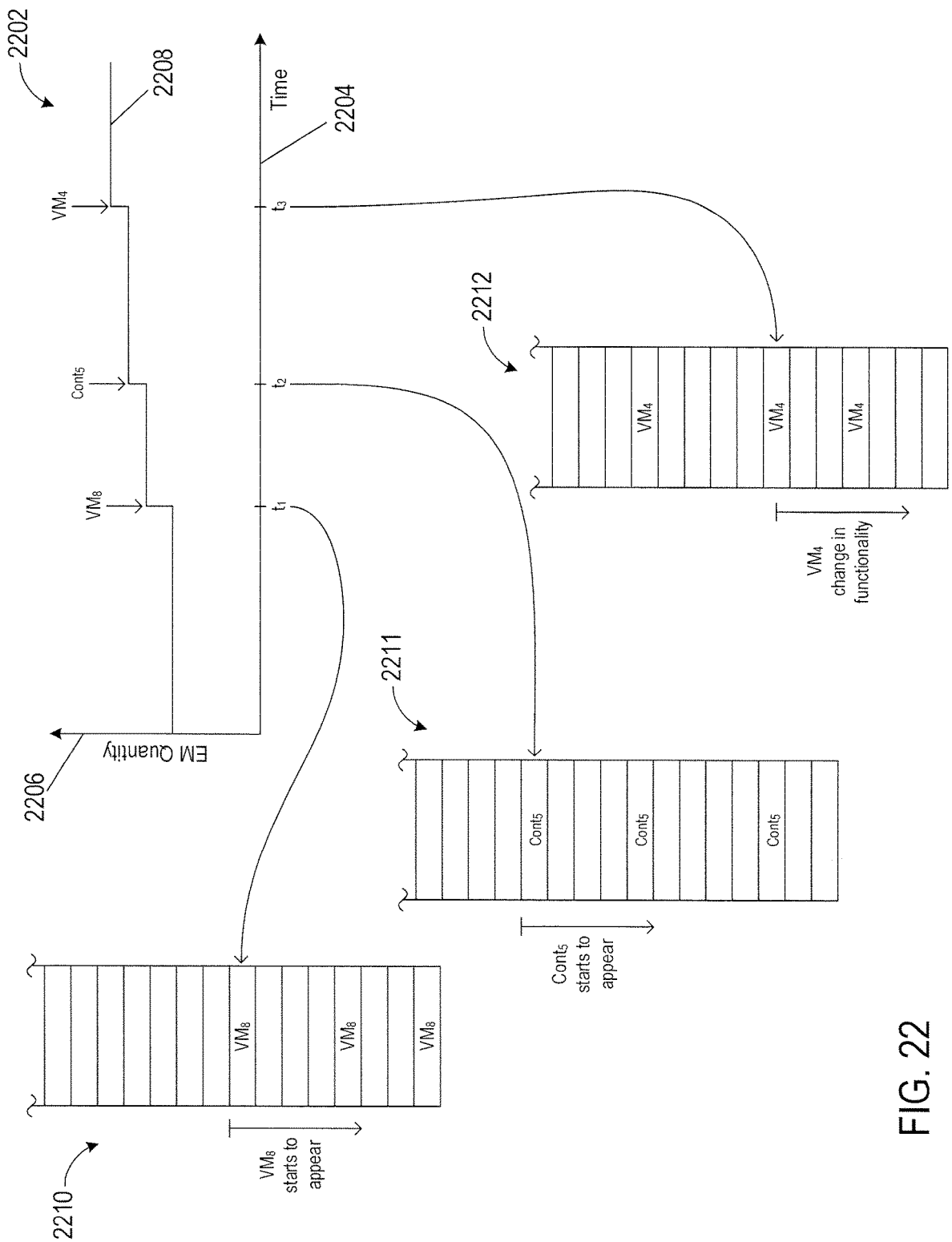
FIG. 22 shows examples of changes in event message quantities received by a monitoring tool as a result of installing two virtual objects and a change in functionality of a virtual object.

A search to identify an installed or uninstalled virtual object or change in functionality of a virtual object may be triggered by a change in quantity of event sources or a change in quantity of event messages received by the monitoring tool 1902. FIG. 22 shows examples of changes in the quantity of event messages received by the monitoring tool 1902 because of installing $VM_8$ and $Cont_5$ and a change in functionality to $VM_4$. Graph 2202 shows a plot of quantity of event messages received by the monitoring tool 1902 of time. Horizontal axis 2204 represents time. Vertical axis 2206 represents event message quantity. In this example, a curve 2208 includes steps at times $t_1$ and $t_2$ that indicate when the virtual objects $VM_8$ and $Cont_5$ start sending event messages to the monitoring tool 1902. An increase in quantity of event messages at time $t_3$ corresponds to a change in the functionality of $VM_4$ that creates additional event messages. A change in quantity may also include a decrease in the quantity of event messages, such as when a virtual object is uninstalled or the functionality of a virtual object is reduced. The times at which quantities of event messages are generated may be used to narrow the search to identify newly installed or uninstalled virtual objects or virtual objects that have experienced a change in functionality. FIG. 22 includes portions of three different event logs 2210-2212 maintained by the monitoring tool 1902. Event messages generated by event sources of $VM_8$ start to appear in the event log 2210. Event messages generated by event sources of $Cont_5$, start to appear in the event log 2211. Event messages generated by event sources of $VM_4$ that correspond to the change in functionality start to appear in the event log 2212. The monitoring tool 1902 performs event type analysis on the event messages recorded in the event logs to identify non-parametric text and phrases that may in turn be searched to identify any newly installed virtual objects or changes in the functionality of a virtual object.

Figure 23:
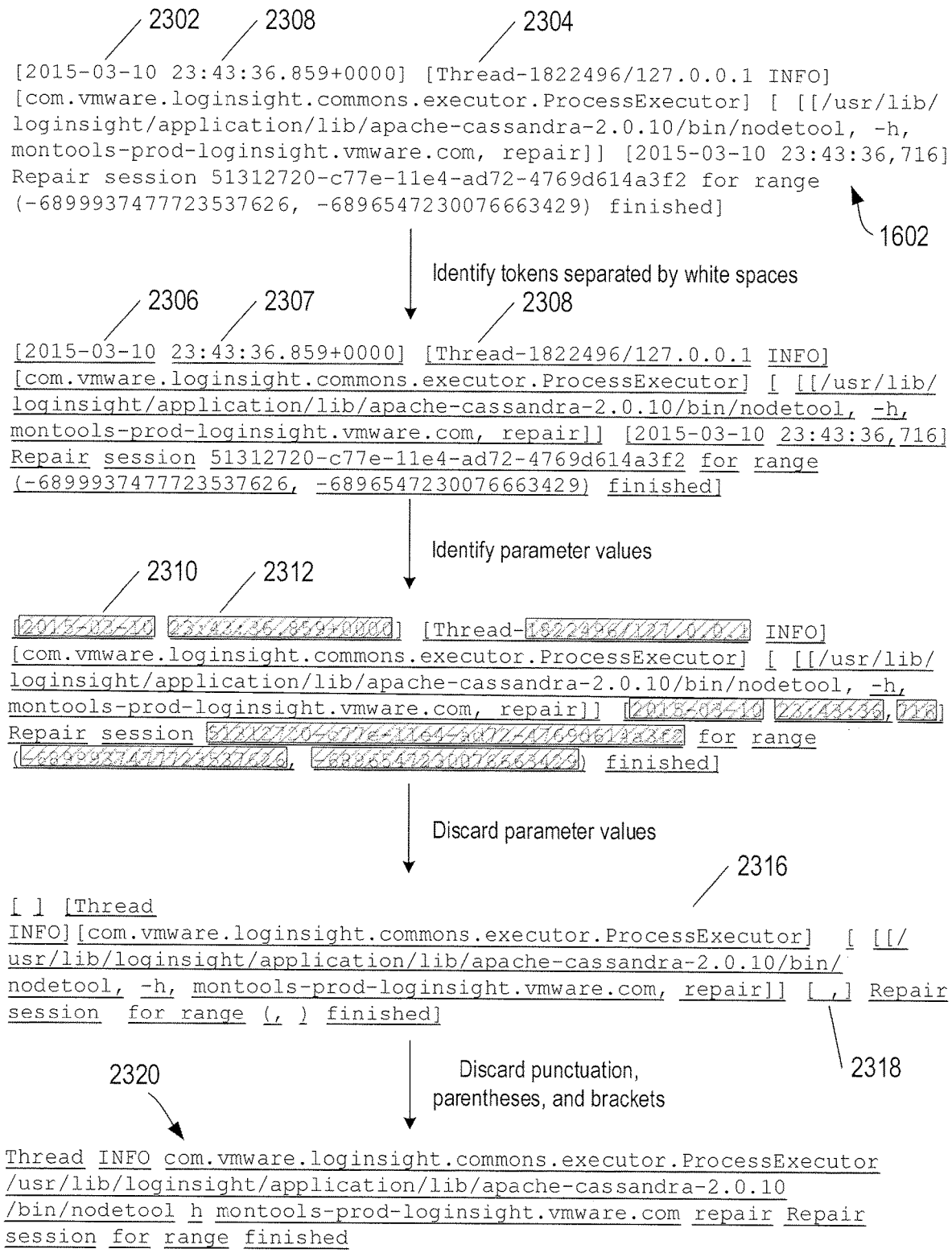
FIG. 23 shows an example of event-type analysis performed on the event message shown in FIG. 16.

FIG. 23 shows an example of event-type analysis performed on the event message 1602 shown in FIG. 16. The event message 1602 is first tokenized by considering the event message as comprising tokens separated by non-printed characters, referred to as "white space." In FIG. 23, this initial tokenization of the event message 1602 is illustrated by underlining of the printed or visible characters. For example, the date 2302, time 2303, and thread 2304 at the beginning of the text contents of the event message 2302, following initial tokenization, become a first token 2306, a second token 2307, and a third token 2308, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Repair session" in event message 1302 likely occurs within each of many repair session event messages. In FIG. 23, the parametric-valued tokens in the event message following initial token recognition are indicated by shading. For example, initial token recognition determines that the first token 2306 is a date and the second token 2307 is a time. The tokens identified as parameters are identified by shaded rectangles, such as shaded rectangle 2310 of the date 2306 and shaded rectangle of 2312 of the time 2307. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing. In the implementation shown in FIG. 23, the event message 1602 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 2314 in FIG. 23. For example, brackets and a coma 2318 are underlined. The punctuation, parentheses, and brackets are discarded leaving a textualized event message of interest 2320 that comprises only the non-parametric text strings and natural language words and phrases of the original event message 1302. The textualized event message 2320 represents an event type. Other textualized event messages with the same non-parametric text strings and natural language words and phrase as the textualized event messages 2320 are the same event type. Another textualized event message with one or more different non-parametric text strings or natural language words and phrase from those of the textualized event messages 2320 is of a different event type.

The monitoring tool 1902 searches the non-parametric text and phrases of event types to identify information about the virtual object and about the functionality of the virtual object. The functionality of a virtual object is determined by the type of server running in the virtual object. For example, the types of servers that may run in a virtual object include specific application server, web server, database server, email server, caching/proxy server, and domain name system ("DNS") server. A virtual object that runs a web server, for example, provides web services to clients, such as a web browser. A virtual object may also run any of various combinations of two or more servers. The identifying information of a virtual object may be checked against the list of virtual objects 1910, shown in FIG. 19B, to determine if the virtual object is a new virtual object. The functionality of a virtual object may be determined based on event types, log source tags, source of network traffic, and name of the application program that generates the event messages.

Similar event messages, such as event messages that are identical except for hostname and parametric values, can be grouped together as an event type. As described above with reference to FIG. 23, event types are determined by eliminating the parametric parts of an event message, leaving the non-parametric tokens, such as text and phrases. An example of how event types can be determined based on event messages is given below:

Event source 1:
$timestamp $hostname httpd started on $time1 as $website1
$timestamp $hostname httpd stopped on $time2 as $website1
Event source 2:
$timestamp $hostname httpd started on $time3 as $website2
$timestamp $hostname httpd stopped on $time4 as $website2.

In this example, variables begin with "$" sign. The two event types are given by:

"httpd started on as" is identified as Event Type 1;
"httpd stopped on as" is identified as Event Type 2.

A functionality of a virtual object can be determined based on a distinct set of event types. For example, if a virtual object identified as "server 1" is sending event types 1 and 2, a second virtual object identified as "server 2" is sending event types 3 and 4, and a third virtual object identified as "server 3" is sending event types 1 and 2, then it may determine that the first virtual object "server 1" and the third virtual object "server 3" have different names but have the same functionality based on the event types 1 and 2.

The non-parametric text and phrases of the event types may be searched by the monitoring tool 1902 for log source tags that identify statically-defined functionalities performed by the virtual objects. An example of a log source tag the monitoring tool 1902 may identify is 'prod':'webserver' in the tag field of a [filelog] configuration section of a configuration file, which can be extracted and used to group together virtual objects that perform a web server functionality. Similarly, log source tags can be used to group together virtual objects that perform a database server functionality. The monitoring tool 1902 may utilize alternative/additional information source(s) to determine the functionality performed by the virtual objects. For example, the monitoring tool 1902 may inspect packet headers.

The functionality of a virtual object may be determined from an IP address of the virtual object. In particular, a virtual object with an unknown functionality may be determined by comparing the IP address of the virtual object with the IP address of other virtual objects of known functionalities. The IP address of the virtual object with an unknown functionality is compared with the IP addresses of virtual objects of known functionality. The virtual object of unknown functionality is assigned the functionality of another virtual object with an IP address that is closest to the IP address of the virtual object of unknown functionality. For example, suppose a virtual object of unknown functionality has an IP address of 10.1.21.40. The IP address is compared with the following list of virtual objects of known functionality:

| Virtual object | IP address | Functionality |
|---|---|---|
| VO$_1$ | 10.1.20.24 | web server |
| VO$_2$ | 10.1.30.24 | database server |
| VO$_3$ | 10.1.40.24 | mail server |

The functionality of the virtual object may be identified as a web server, because the corresponding IP address 10.1.21.40 is closest the IP address of the virtual object VO$_1$. In particular, the network portion "10.1" of the addresses are the same. But, the subnet portion "21.40" of the IP address is closest to the subnet portion "20.24" of VO$_1$ IP address.

The functionality of a virtual object may be determined by the monitoring tool 1902 by examining event messages for sources of network traffic sent to the virtual object. Internet socket destination port numbers that a server application of a virtual object uses to receive data may be used by the monitoring tool 1902 to determine the functionality of the virtual object. Example of internet socket ports include the transmission control protocol ("TCP") ports, user datagram ("UDP") ports, and stream control transmission protocol ("SCTP") ports. The destination port a virtual object is used to receive network traffic from a client, specific process, or services can be used to identify or reinforce identification of the functionality of the virtual object. Examples of TCP ports include, but are not limited to, TCP ports 21-22 file transfer protocols, TCP port 22 is a secure shell, TCP port 25 is simple mail transfer protocol, TCP port 53 domain name system, TCP port 80 http web, TCP port 443 https/secure web, and TCP port 123 is a network time protocol. In particular, the monitoring tool 1902 includes network servers, such as VMware NSX and Network Insight, that are used to identify sending and receiving ports of a virtual object. The monitoring tool 1902 compares the identified destination ports to the list of TCP, UDP, or SCTP ports and assigns a functionality to the virtual object or reinforces the functionality already assigned to the virtual object. For example, a virtual object that receives data on a TCP port 80 and replies is an indication that the virtual object is an http web server.

Identification of a functionality performed by a virtual object may be determined from the name of the application program that generated the event message. Two application programs may generate similar event messages except for correction/refinement steps, such as taking into account which application programs are generating particular event types based on the application name. For example, an "httpd started on as" event message from application program name "httpd" is not related to an application program with an event message that also states "httpd started on as" but from an application name "some-virus."

Figure 24A:
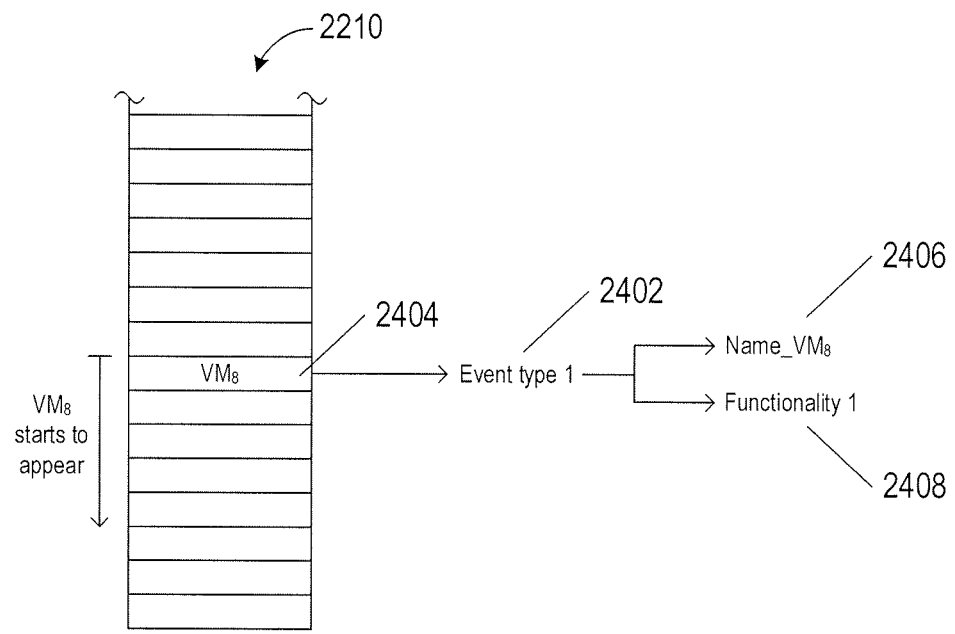
FIGS. 24A-24B show an example of identifying a new virtual object and a change in function of another virtual object from event messages of event logs.
Figure 24B:
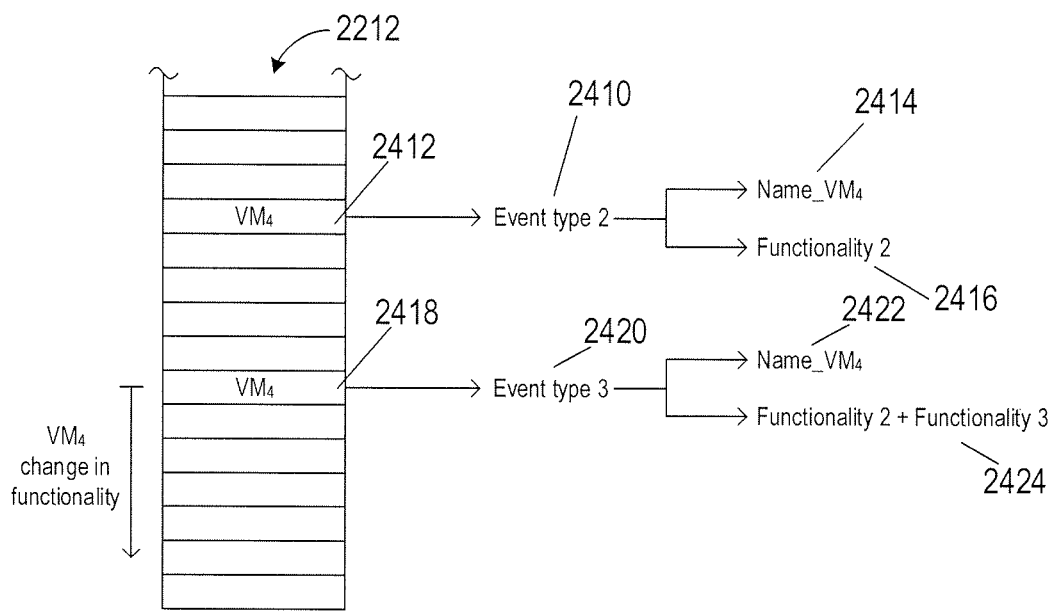

FIGS. 24A-24B show an example of identifying a new virtual object and a change in function of another virtual object. In FIG. 24A, event-type analysis produces an "event type 1" 2402 for an event message 2404 generated by an event source of the VMs. The non-parametric text and phrase of the event type 1 may be searched to determine the name "Name_VMs" 2406 and functionality "Functionality 1" 2408 of VMs, as described above. The name "Name_VM" may be compared with the list of virtual machines stored in the centralized repository to determine that VMs is a new virtual object In FIG. 24B, event-type analysis produces an "event type 2" 2410 for an event message 2412 generated by an event source of VM$_4$. The non-parametric text and phrase of the event type 1 may be searched to determine the name "Name_VM$_4$" 2414 and functionality "Functionality 2" 2416 of VM$_4$, as described above. As described above with reference to FIG. 22, the functionality of VM$_4$ changes at time $t_3$. When the event type analysis is applied to event message 2418, a different event type "event type 3" 2420 is revealed. A search of the non-parametric text and phrases of the "even type 3" 2420 reveals the name "Name_VM$_4$" 2422 and functionality "Functionality 2+Functionality 3" 2424. Because the virtual object identified in the event messages 2412 and 2418 is VM$_4$, the functionalities 2416 and 2424 are compared to reveal that the functionality of VM$_4$ is different.

When a new virtual object is detected, or a change in functionality of an existing virtual object is detected, the monitoring configuration of the monitoring tool 1902 is changed to begin receiving and processing event messages from the new virtual object or changed functionality of the existing virtual object. Adjustments to the monitoring configuration of the monitoring tool 1902 are determined from expected configuration rules. The new virtual object or change in functionality of the existing virtual object may also increase the volume of metric data sent to the monitoring tool 1902. As a result, the infrastructure resources used to support the monitoring tool 1902 may have to be adjusted. Adjustments to the infrastructure resources used by the monitoring tool 1902 are determined from resource allocation rules. The expected configuration rules and resource allocation rules may be stored in separate databases and searched to identify which rules are used to adjust the monitoring configuration of the monitoring tool 1902 and adjust the resources available to the monitoring tool 1902.

Figure 25:
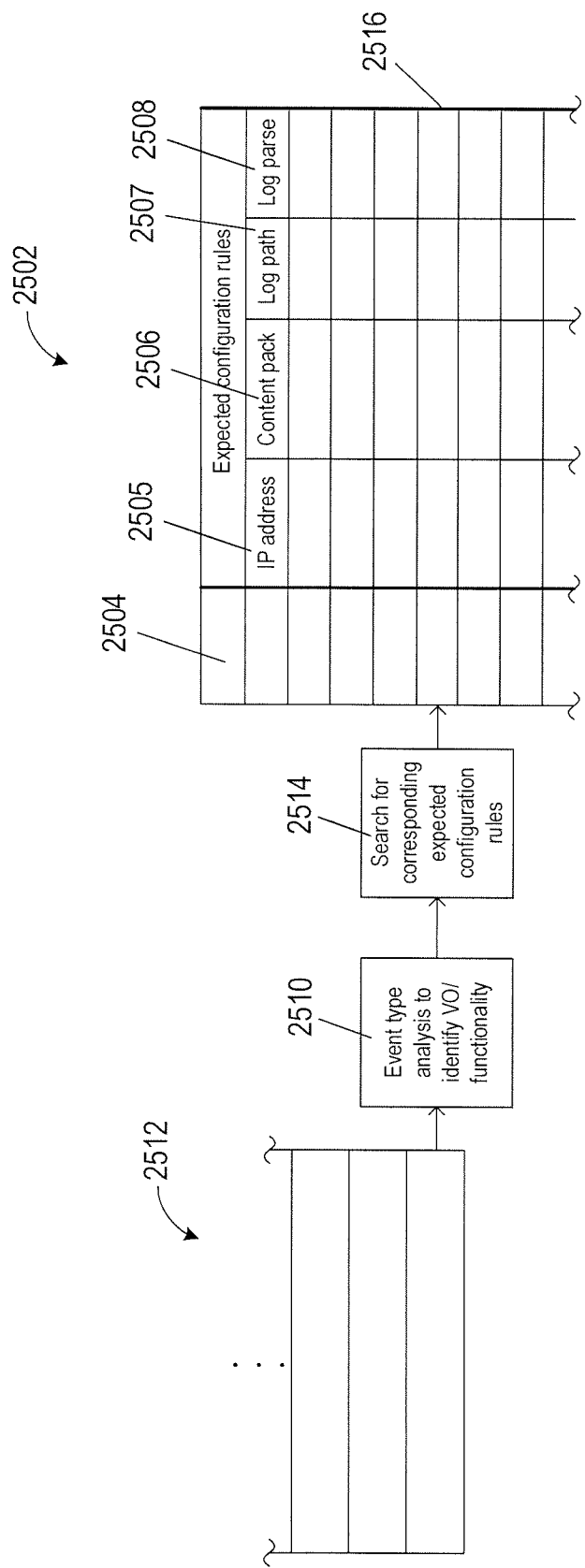
FIG. 25 shows a table of example contents of a database of expected configuration rules.

FIG. 25 shows a table 2502 of example contents of a database of expected configuration rules. Column 2504 list the names and/or functionality of the virtual object and columns 2505-2508 list the corresponding IP address of the virtual object. In this example, the expected configuration rules 2502 also includes a content pack, log path, and log parse information regarding the one or more application programs that run in the virtual object. Event type analysis 2510 is performed on the event messages of an event log 2512 as described above to determine the name and functionality of the virtual object. The name and/or functionality of the virtual object are used to search 2514 the database 2502 for corresponding expected configuration rules 2516. The IP address is loaded into the monitoring tool 1902. The monitoring tool 1902 uses the IP address to reconstruct monitoring group configurations of virtual objects with the same functionality as explained below with reference to FIG. 27A-27B. The monitoring tool 1902 recognizes the functionality of the virtual object, but uses the IP address to communicate with the virtual object. A content pack is a plugin to the monitoring tool 1902 that provides pre-defined information about specific types of events created by the one or more application programs and services running in the virtual object. The content pack includes instructions to reconfigure the monitoring configuration of a log monitoring agent (i.e., install log paths and log parser) of the server computer that runs the virtual object. With a content pack installed in the monitoring tool 1902 and the log path and log parse installed on the server computer that host the virtual object, event messages may be forwarded to the monitoring tool 1902, the monitoring tool 1902 is able to monitor the virtual machine log directories and event logs, parse application program event messages and extracts fields from event messages, such as httpd status codes, create dashboards to view the application program status, and generate alerts that notify a systems administrator about critical events and domain specific information about event logs.

Figure 26:
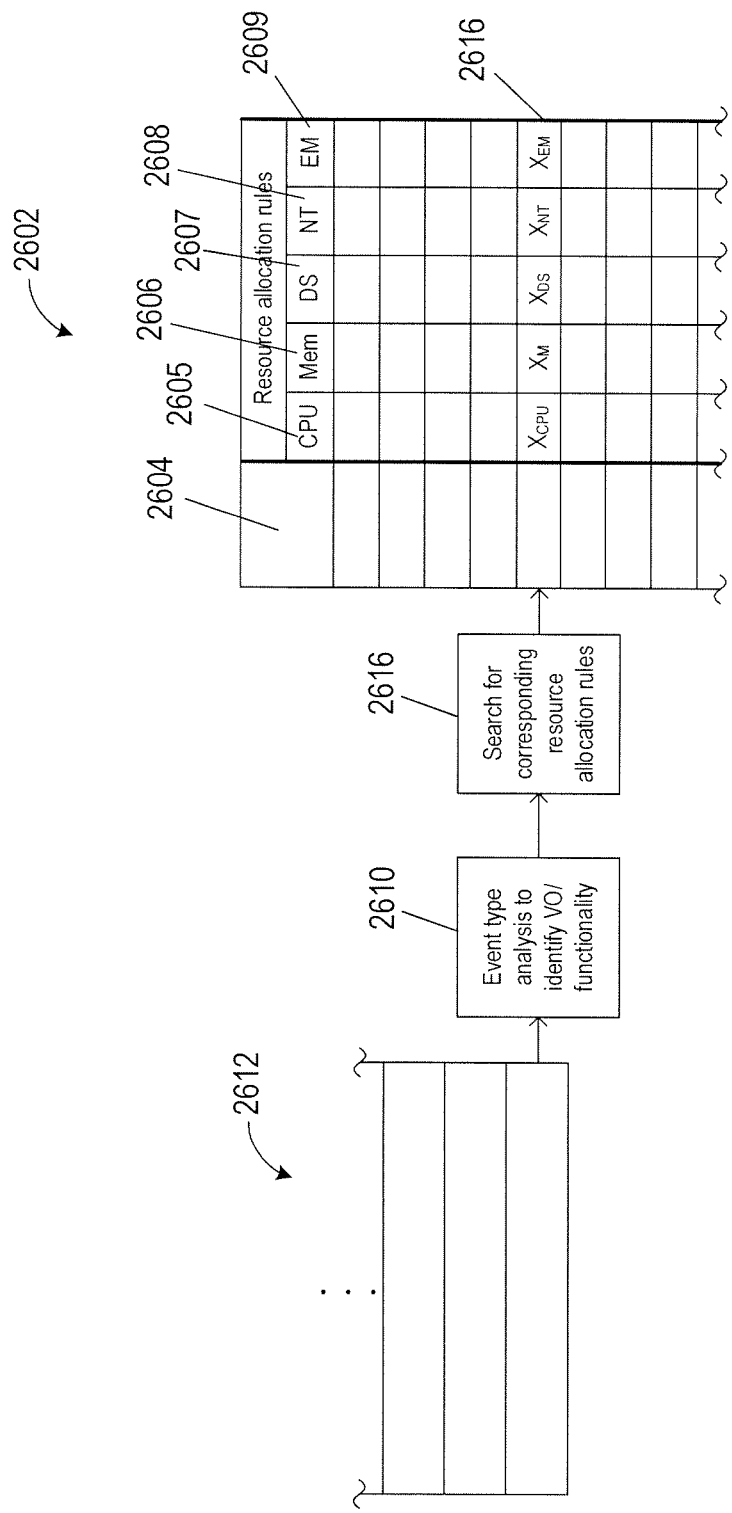
FIG. 26 shows a table of example contents of a database of resource allocation rules.

FIG. 26 shows a table 2602 of example contents of a database of resource allocation rules. Column 2604 list the names and/or functionality of the virtual object and columns 2605-2609 list the corresponding resource allocation rules for resources of the monitoring tool 1902. Event type analysis 2610 is performed on the event messages of an event log 2612 as described above to determine the name and functionality of the virtual object. The name and/or functionality of the virtual object are used to search 2614 the database 2602 for corresponding resource allocation rules 2616 denoted by $X_{CPU}$, $X_M$, $X_{DS}$, $X_{NT}$, and $X_{EM}$. Each resource allocation rule represents the amount of increase in resource usage by the monitoring tool 1902 as a result of the new virtual object and/or change in functionality of the virtual object. A rule regarding an expected increase in CPU usage by the monitoring tool 1902 is denoted by $X_{CPU}$. A rule regarding an expected increase in the amount of data storage by the monitoring tool 1902 is denoted by $X_{DS}$. A rule regarding an expected increase in memory usage by the monitoring tool 1902 is denoted by $X_M$. A rule regarding an expected increase in the amount of network traffic per unit of time by the monitoring tool 1902 is denoted by $X_{NT}$. A rule regarding an expected increase in the number of event messages per unit time to be received by the monitoring tool 1902 is denoted $X_{EM}$.

Figure 27A:
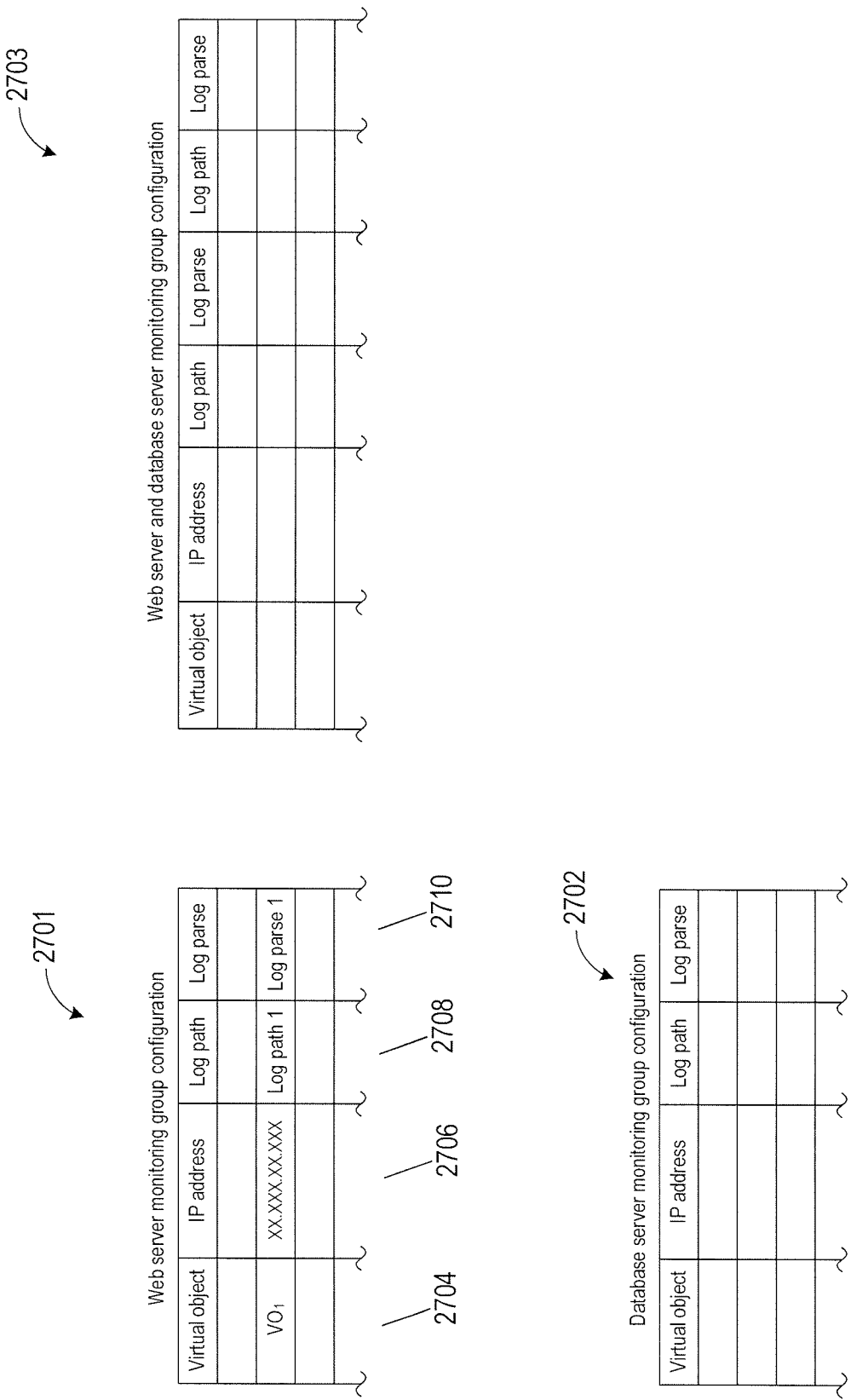
FIG. 27A show tables that represent examples of monitoring group configurations maintained by a monitoring tool.

The monitoring tool 1902 maintains monitoring group configurations based on the functionalities of virtual objects. In other words, the virtual objects with the same functionality, such as web servers or database servers, are grouped together. FIG. 27A show tables 2701-2703 that represent examples of monitoring group configurations maintained by the monitoring tool 1902. Web server monitoring group configuration 2701 comprises a list of names 2704 of virtual objects with the same web server functionality. Each virtual object has a corresponding IP address 2706, log path 2708, and log parse 2710. For example, a virtual object denoted by $VO_1$ has web server functionality. The virtual object $VO_1$ has an IP address, XX.XXX.XX.XXX, log path 1, and a log parse 1 that the monitoring tool 1902 uses to receive, store, and analyze data and event messages from the virtual object $VO_1$. Database server monitoring group configuration 2702 comprises a list of names of virtual objects with the same database server functionality and corresponding IP addresses, log paths, and log parses the monitoring tool 1902 uses to receive, store, and analyze data and event messages. Monitoring group configuration 2703 comprises a list of virtual objects that provide both web services and database services.

Figure 27B:
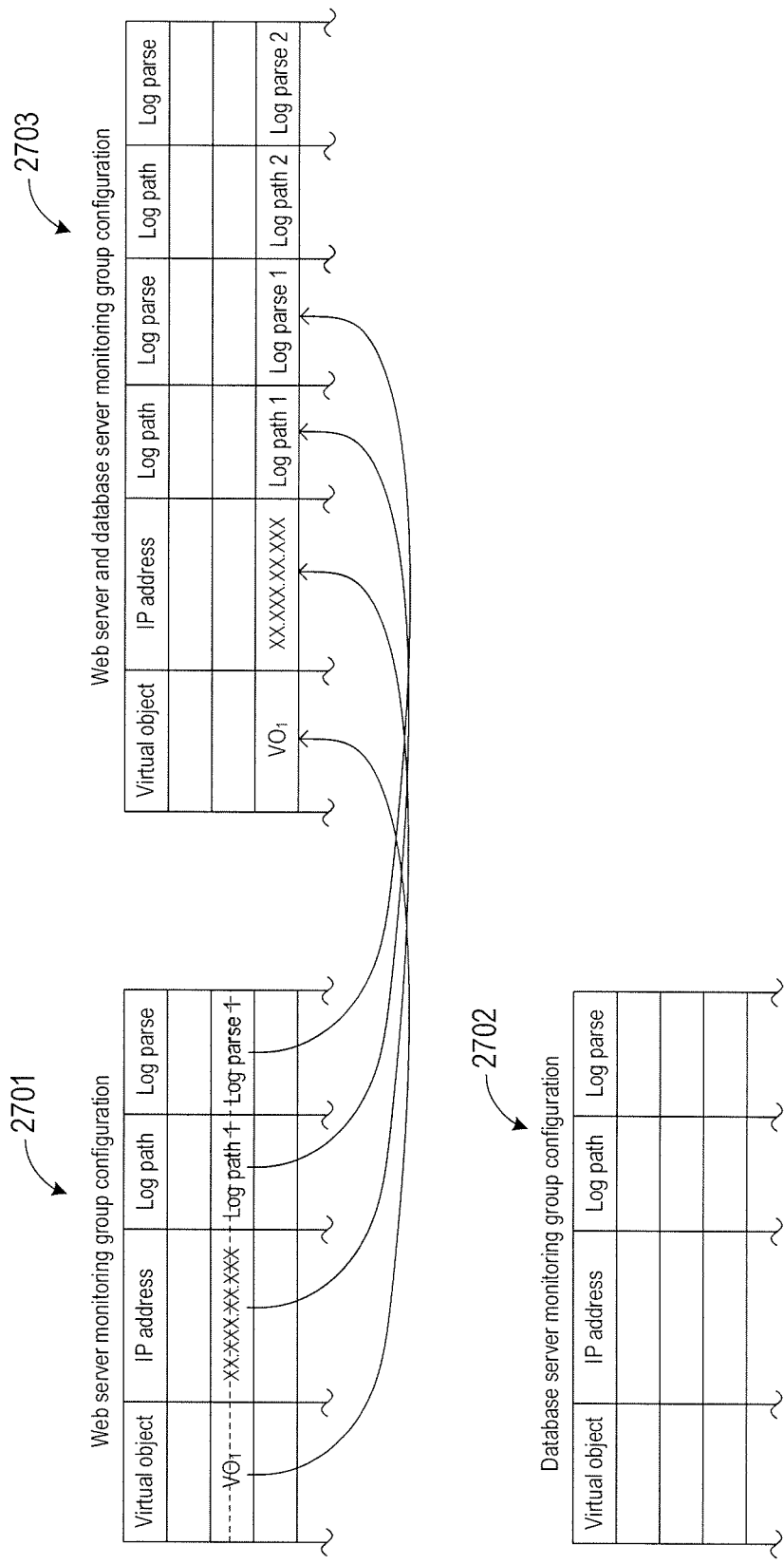
FIG. 27B shows an example of updating monitoring group configurations.

When the functionality of a virtual object changes, the corresponding monitoring group configurations maintained by the monitoring tool 1902 is updated according to the expected configuration rules determined as described above with reference to FIG. 25. For example, suppose the functionality, database server, is added to the virtual object $VO_1$ as described above with reference to FIG. 27A. The monitoring group configurations maintained by the monitoring tool 1902 are updated. FIG. 27B shows updating the web server monitoring group configuration 2701 by deleting the configuration information of the virtual object $VO_1$. The web server and database server monitoring group configuration 2703 is updated using the expected configuration rules. In particular, monitoring group configuration 2703 is updated to copying the IP address of the virtual object $VO_1$, log path 1, and log parse 1 from the web server monitoring group configuration 2701 and adding the expected configuration rules for the database server added to the virtual object $VO_1$, which includes the log path 2 and log parse 2 of the database server. The log path 2 and log parse 2 may be part of a content pack associated with the database server listed in the expected configuration rules.

The monitoring tool 1902 also maintains domain knowledge about itself. In particular, the monitoring tool 1902 maintains a record of average number of events per second, average size of the event messages, and names of monitored application programs to predict required resources. For example, the monitoring tool 1902 typically receives an average of 1000 event messages per second with an average size of event messages 165 bytes. After a new virtual object is installed, or the functionality of an existing virtual object has changed, the average number of event messages jumps to 2000 per second and the average size of event messages increase to 230 bytes. In another example, the monitoring tool 1902 identifies in event messages recorded in the event logs a new "httpd" application program name. The monitoring tool 1902 may search internal database of application program names or empirical statistics on known application programs for other httpd application programs that indicate the amount of each resource used by the monitoring tool 1902 to monitor such a known application program.

The resource allocation rules described above with reference to FIG. 25 are used to determine the expected impact of installing or uninstalling a virtual object or changing the functionality of a virtual object on infrastructure resources of the monitoring tool 1902. In certain implementations, the expected impact on resources may be determined by thresholds associated with each infrastructure resource. Let the parameter $X_r$ be an expected use parameter of an infrastructure resource for the monitoring tool 1902 as a result of installing or uninstalling a virtual object or changing the functionality of a virtual object, where the subscript "r" represents an infrastructure resource. For example, when r=CPU, the parameter $X_r$ represents additional expected impact on CPU usage, $X_{CPU}$, by the monitoring tool 1902 as a result of installing or uninstalling a virtual object or changing the functionality of a virtual object. Consider a quantity, $X_{r,cur}$, that represents the amount of an infrastructure resource "r" currently in use by the monitoring tool 1902. A threshold, $th_r$, represents an acceptable threshold for using the infrastructure resource. The expected impact on the resource r by installing the virtual object or change in the functionality of a virtual object may be computed as follows:

$$\text{Expected Impact} = X_r + X_{r,cur} \quad (1)$$

When the following condition is satisfied $$X_r + X_{r,cur} < th_r \quad (2)$$

the expected impact on the resource r used by the monitoring tool 1902 is not considered a problem. On the other hand, when the following condition is satisfied, $$X_r + X_{r,cur} \geq th_r \quad (3)$$

an alert may be generated indicating that the monitoring tool 1902 is expected to use more of the resource r than is acceptable.

In other implementations, the expected impacts may be determined as percentages of capacity of infrastructure resources that are expected to be used by monitoring tool 1902. A percentage of infrastructure resources may be calculated as follows:

$$P(X_r) = \frac{X_r}{X_{r,cap}} \times 100 \quad (4)$$

where $X_{r,cap}$ is the capacity of the infrastructure resource r.

Consider a threshold $Th_r$ (i.e., $Th_r \leq 100$) that represents an acceptable threshold for using of the infrastructure resource. The expected impact may be computed as follows:

$$\text{Expected Impact} = P(X_r) + P(X_{r,cur}) \quad (5)$$

When the following condition is satisfied $$P(X_r) + P(X_{r,cur}) < Th_r \quad (6)$$

the expected impact of the monitoring tool 1902 on the infrastructure resource is not considered a problem. On the other hand, when the following condition is satisfied for the infrastructure resources, $$P(X_r) + P(X_{r,cur}) \geq Th_r \quad (7)$$

an alert may be generated indicating that the monitoring tool 1902 is expected to use more of the infrastructure resource r than is acceptable.

For example, suppose 100 GB of memory capacity of a server computer is allocated to the monitoring tool 1902, with a threshold of 90%, and 70 GB (i.e., 70%) of the memory is currently in use by the monitoring tool 1902. When a virtual object is installed, or the functionality of an existing virtual is increased, an additional 10 GB (i.e., 10%) of memory is expected to be used by the monitoring tool 1902 to handle the incoming metric data and event messages from the virtual object. The expected impact would be 80 GB (i.e., 80%), which is less than the 90% threshold. As a result, no adjustments are made to the amount of memory allocated to the monitoring tool 1902. On the other hand, suppose the virtual object is expected to have a memory usage of 25 GB. The expected impact would be 95 GB (i.e., 95%), which is greater than the threshold. As a result, the amount of memory made available to the monitoring tool 1902 is increased to accommodate the expected impact.

Depending on the type of infrastructure resources impacted, the monitoring tool 1902 may generate commands to adjust the availability of the infrastructure resource to accommodate the expected impact on the monitoring tool 1902. For example, the monitoring tool 1902 may allocate additional CPU or memory of the server computer that host the monitoring tool 1902.

Figure 28:
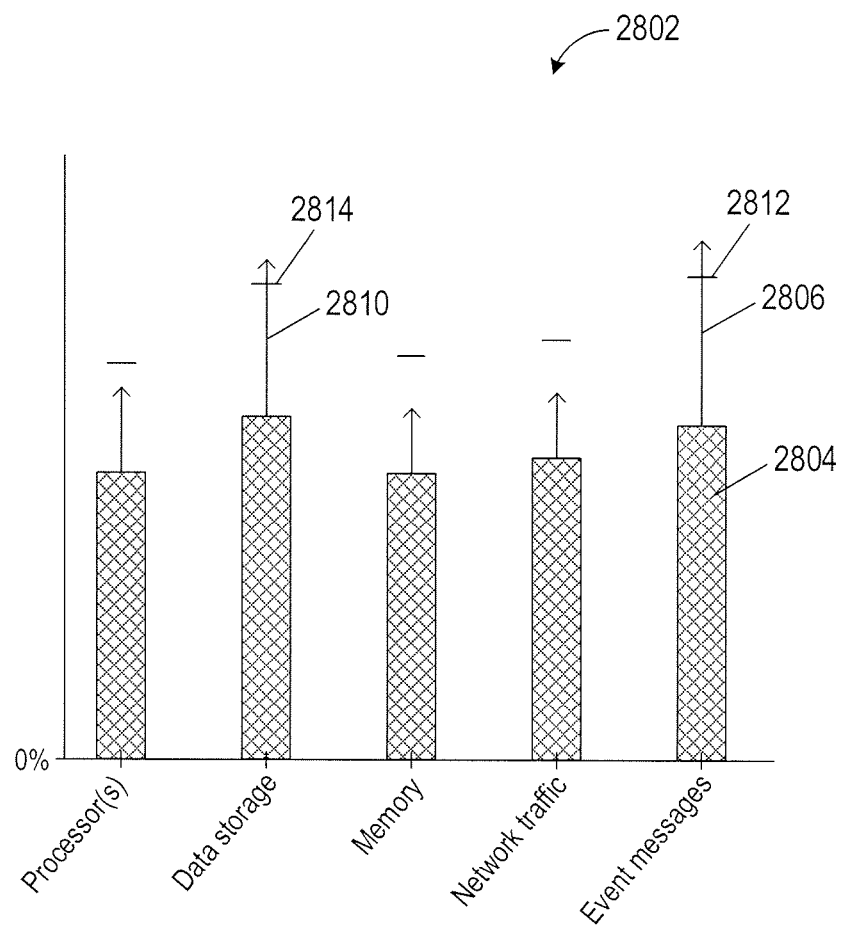
FIG. 28 shows a bar chart of operational data for a monitoring tool.

FIG. 28 shows a bar chart 2802 of operational data for the monitoring tool 1902. Bars, such as bar 2804, represent current operational data handled by the management server computer 1808 of FIG. 18. Directional arrows, such as directional arrow 2806, located at the top of bars represent expected increases in operational data as a result of installing a virtual object or change in functionality of a virtual object. For example, the expected increase 2806 in event messages may be obtained from the resource allocation rules as described above with reference to FIG. 25. The expected increase 2806 in event messages may also create an expected increase 2810 in data storage. In the example of FIG. 28, the monitoring tool 1902 determines that the expected impact of the number of event messages and amount of data storage will exceed the thresholds 2812 and 2814. In response, the monitoring tool 1902 may generate API commands that are sent to the infrastructure controller 1904, instructing the infrastructure controller 1904 to allocate more data storage for the management server computer 1808 to handle the expected increase in demand for data storage and storage of event messages.

The resource allocation rules describe above with reference to FIG. 25 may be obtained from application program vendors or from a system administrator that manually enters the rules based on observing the demand for infrastructure resources by the monitoring tool 1902 based on the virtual objects with the same functionality. Alternatively, when no resource allocation rules are available, the allocation resource rules may be created by collecting and maintaining a record of how much usage of the infrastructure resources by the monitoring tool 1902 change as a result of a recently installed virtual object or change in functionality of the virtual object.

Figure 29:
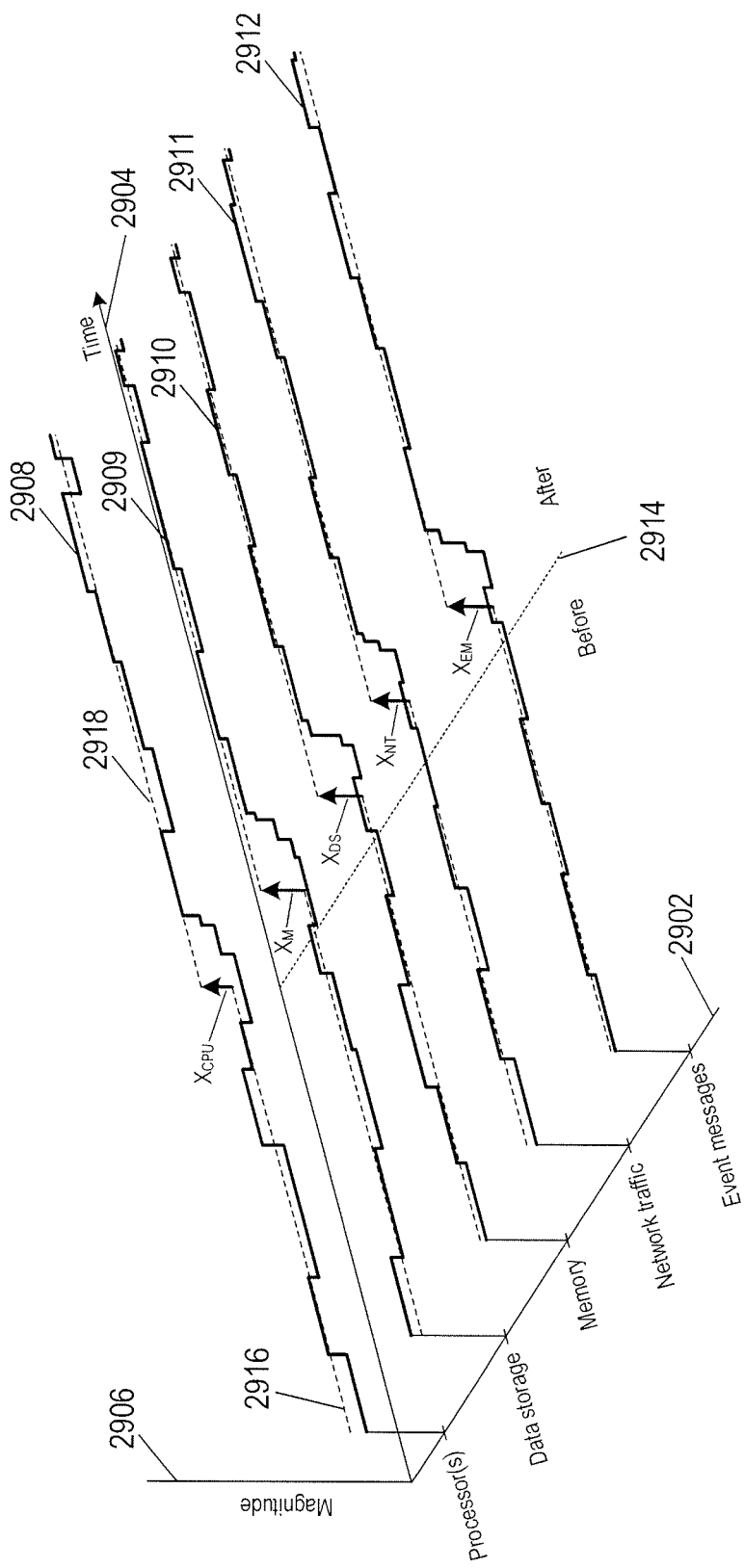
FIG. 29 shows operational data collected for processor(s), data storage, memory, network traffic, and event messages of a management server computer used to host a monitoring tool.

FIG. 29 shows operational data collected for processor(s), data storage, memory, network traffic, and event messages of the management server computer used to host the monitoring tool 1902. Axis 2902 list the processor(s), data storage, memory, network traffic, and event messages. Axis 2904 represents time. Axis 2906 represents the magnitude of the different categories of operational data. Curves 2908-2912 represent metric data collected for the different categories of operation data. Curve 2908 represents total CPU usage for one or more processors of the server computer. Curve 2909 represents the amount of data storage used by the application program. Curve 2910 represents the amount of memory in use at the server computer. Curve 2911 represents the network traffic at the server computer. Curve 2912 represents the number of event messages received by the monitoring tool 1902. Dotted line 2914 marks the time when the new virtual object or change in functionality of the virtual object takes place. The monitoring tool 1902 collects operational data for each of the different categories. Dashed lines, such as dashed line 2916, represent the average of each metric collected in a time interval before the new virtual object or change in functionality of the virtual object takes place. Dashed lines, such as dashed line 2918, represent the average of the operation data collected in a time interval after the new virtual object or change in functionality of the virtual object takes place. A resource allocation rule may be calculated as a difference between the average of the metric data collected before and after the start of the new virtual object or change in functionality of the virtual object:

$$X_r = \text{ave}\_X_{r,before} - \text{ave}\_X_{r,after} \qquad (8)$$

where ave$\_X_{r,before}$ is the average of metric data of the resource r collected in a time interval before the new virtual object or change in functionality of the virtual object takes place; and ave$\_X_{r,after}$ is the average of the metric data associated of the resource r collected in time interval after the new virtual object or change in functionality of the virtual object takes place.

The monitoring tool 1902 can monitor, manage and optimize virtual objects that are member of a population of virtual objects. The monitoring tool 1902 can optimize populations of virtual objects by monitoring history of how server computers use the services and quantities of other servers. The monitoring tool 1902 has stored relationships between the various types of servers.

When a new virtual object is installed or the functionality of a virtual object is changed, the monitoring tool 1902 may respond to an increased or decreased demand for auxiliary services or make a change to the auxiliary services. Examples of auxiliary services include, but are not limited to, services provided an authentication server, domain name system ("DNS") server, and network time protocol ("NTP") server. The monitoring tool 1902 can optimize populations of virtual objects by monitoring the history of how server computers use the services and quantities of other servers. The monitoring tool 1902 may store auxiliary service rules that represent the relationships between the various types of servers and corresponding auxiliary servers. For example, the monitoring tool 1902 may store the auxiliary service rule that 100 web servers use 1 DNS server. Suppose a logical application initially has 300 web servers and 3 DNS servers. Now suppose an administrator increases the number of web servers to 500 web servers for the logical application. The monitoring tool 1902 uses the 100 web servers to one DNS server rule to alert the systems administrator that the number of DNS servers should be increased by two to satisfy the demand for DNS services created by the additional 200 web servers. Increasing the number of DNS services creates an additional demand for resources by the monitoring tool 1902. The monitoring tool 1902 searches the database of resource allocation rules 1602 to obtain the resource allocation rules associated with the auxiliary service rule, as described above with reference to FIG. 26. In this example, the auxiliary service rule indicates an increase DNS servers. When an auxiliary service is no: available in the resource allocation rules, the rule may be obtained as described above with reference to FIG. 29. The monitoring tool 1902 also searches the database of expected configuration rules 1602 to obtain the expected configuration rules associated with any added auxiliary servers, as described above with reference to FIG. 26. The monitoring configuration of the monitoring tool 1902 is adjusted to receive and process event messages from the added auxiliary servers.

Figure 30A:
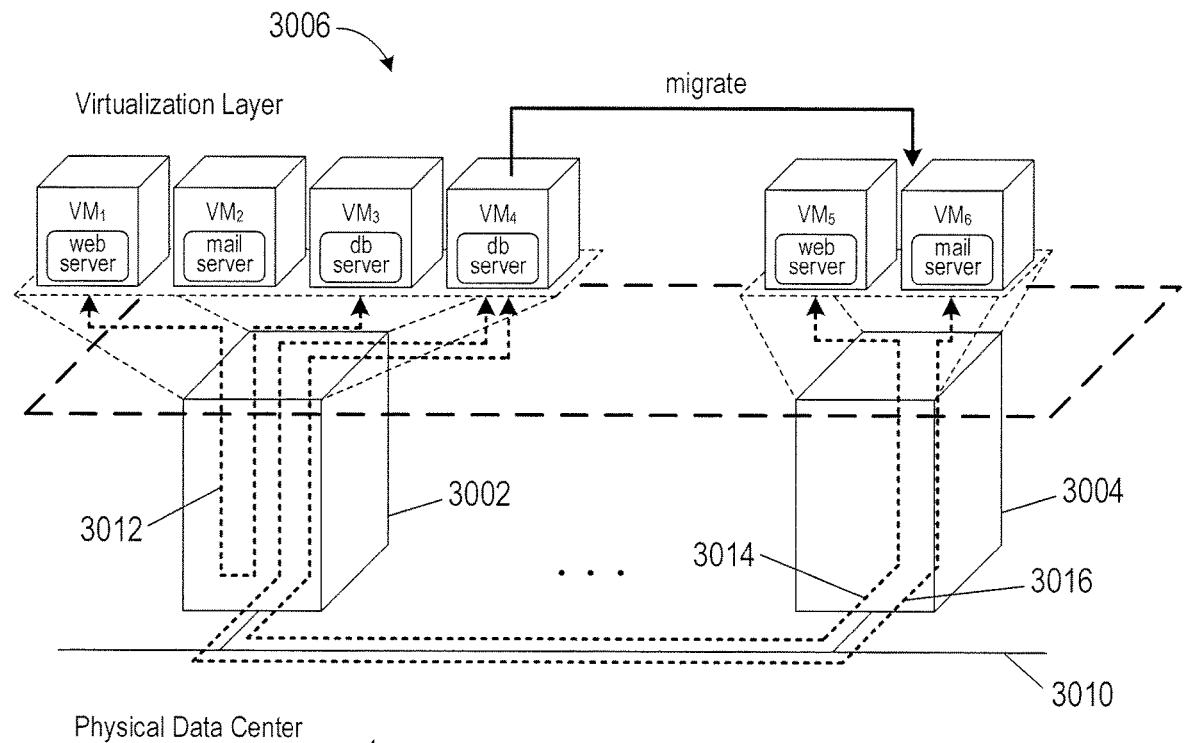
FIGS. 30A-30B show an example of optimizing use of infrastructure resources by virtual objects of the same logical application program distributed across two server computers.
Figure 30B:
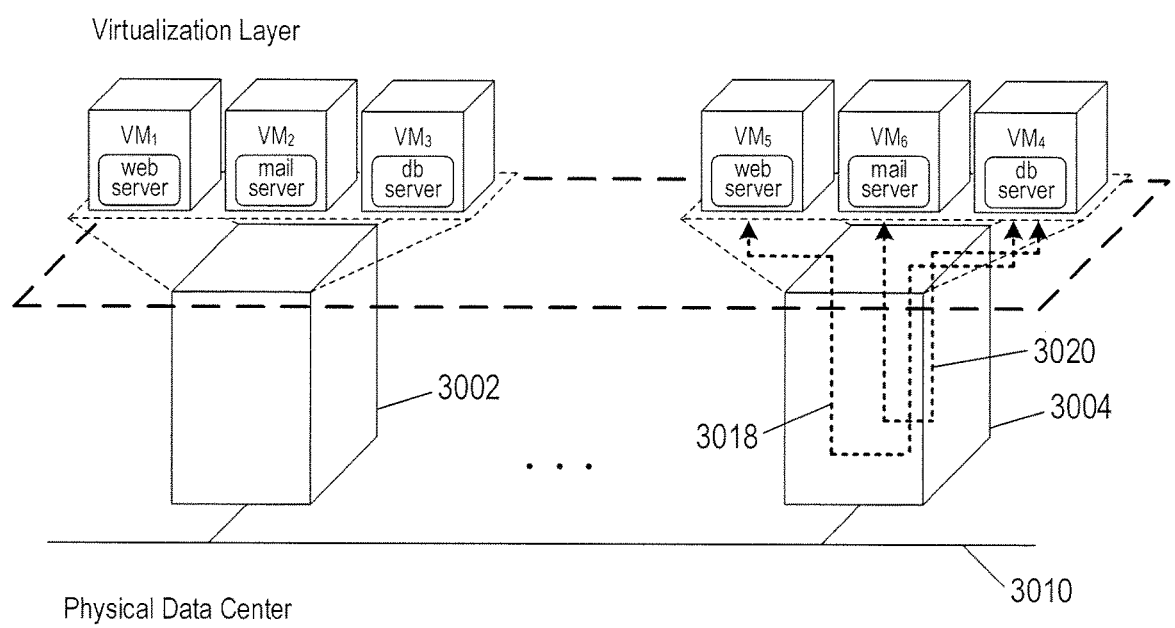

The monitoring tool 1902 may optimize the infrastructure resources assigned to the virtual objects of a logical application program by migrating the virtual objects to reduce the number of server computers used to host the virtual objects. FIGS. 30A-30B show an example of optimizing use of infrastructure resources by virtual objects of the same logical application program distributed across two server computers. In FIG. 30A, four VMs $VM_1$, $VM_2$, $VM_3$, and $VM_4$ run on a server computer 3002 and two VMs $VM_5$ and $VM_6$ run on a server computer 3004. The VMs are located in the virtualization layer 3006. The server computers 3002 and 3004 are part of a physical data center 3008 and are connected by a physical network 3010. In this example, the three VMs $VM_1$, $VM_2$, and $VM_3$ have different functionalities in which $VM_1$ runs a web server, $VM_2$ runs a mail server, and $VM_3$ runs a database server. The three VMs $VM_4$, $VM_5$, and $VM_6$ also have different functionalities in which $VM_4$ runs a database server, $VM_5$ runs a web server, and $VM_6$ runs a mail server. The six VMs form a logical application program that provides email services to web clients. However, the way in which the VMs are distributed on the two server computers 3002 and 3004 is not an optimal use of infrastructure resources. For example, the web server located in $VM_1$ may access the database server located in $VM_3$. In this case, transmission of data is carried out entirely within the server computer 3002, as represented by path 3012, which is an example of optimized use of resources. On the other hand, when the web server and mail server run in $VM_5$ and $VM_6$, respectively, access the database server in $VM_4$, data transmissions are carried out between the server computers 3002 and 3004 over the physical network 3010, as represented by paths 3014 and 3016, which is an example of non-optimal use of resources. Data transmissions between server computers 3002 and 3004 increases time of data transmission and costs.

The monitoring tool 1902 identifies virtual objects of the same logical application program distributed across two or more server computers. The monitoring tool 1902 may maintain a list of logical applications that each comprises two or more virtual objects. Each data packet sent from a virtual object contains the IP address of the source virtual object and a receiver virtual object. As described above, the monitoring tool 1902 identifies logical application programs from the event messages. The monitoring tool 1902 checks the distribution of functionalities of the virtual objects of the logical application across the server computers. If the functionalities are not evenly distributed, the monitoring tool 1902 migrates virtual objects to create an equal distribution of virtual objects running on the server computers. The monitoring tool 1902 dynamically change the destination IP address of the migrated virtual object so that of the virtual objects on the same host server computer can send and receive data from the migrated virtual object.

Returning to the FIG. 30A, because the source and receiver hosts of $VM_4$ is different from $VM_5$ and $VM_6$, the monitoring tool 1902 migrates $VM_4$ to the server computer 3004 to create an equal distribution across the two server computers 3002 and 3004. The monitoring tool 1902 then changes the destination IP address of VM5 and VM6 to VM4 so that the web and mail servers of $VM_5$ and $VM_6$ have access to the database server of $VM_4$ entirely within the server computer 3004, as represented by paths 3018 and 3020, which is an optimal use of the infrastructure resources because data transmissions are carried entirely with the server computer 3004 and use of the physical network 3010 is avoided.

The method described below with reference to FIGS. 31-40 may be stored in one or more data-storage devices as machine-readable instructions that when executed by one or more processors of the computer system described above with reference to FIG. 1 to adjust a monitoring tool and auxiliary services of a distributed computing system.

Figure 31:
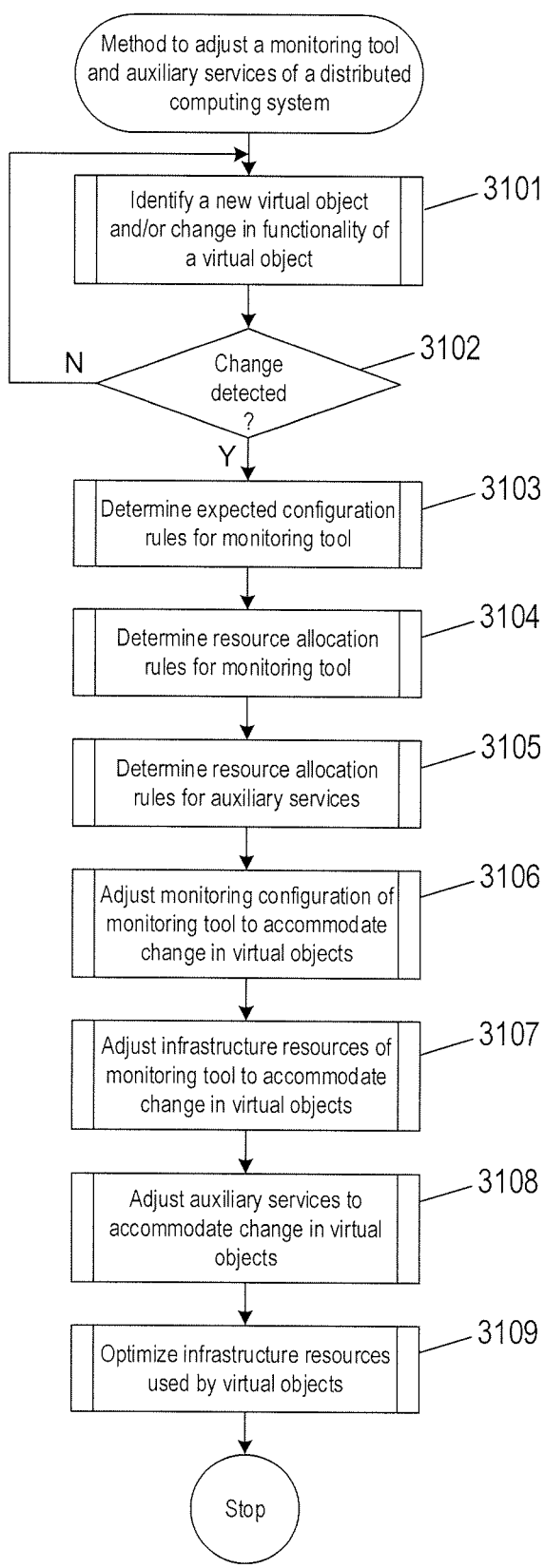
FIG. 31 shows a control flow diagram of a method to adjust a monitoring tool and auxiliary services of a distributed computing system.

FIG. 31 shows a control flow diagram of a method to adjust a monitoring tool and auxiliary services of a distributed computing system. In block 3101, a routine "identify a new virtual object and/or change in functionality of a virtual object" is called. In decision block 3102, when a new virtual object and/or change in functionality of a virtual object is identified, control flows to block 3103. In block 3103, a routine "determine expected configuration rules for monitoring tool" is called. In block 3104, a routine "determine resource allocation rules for monitoring tool" is called. In block 3105, a routine "determine resource allocation rules for auxiliary services" is called. In block 3106, a routine "adjust monitoring configuration of monitoring tool to accommodate change in virtual objects" is called. In block 3107, a routine "adjust infrastructure resources of the monitoring tool to accommodate change in virtual objects" is called. In block 3108, a routine "adjust axillary services to accommodate change in virtual objects" is called. In block 3109, a routine "optimize infrastructure resources used by virtual objects" of the distributed computing system is called.

Figure 32:
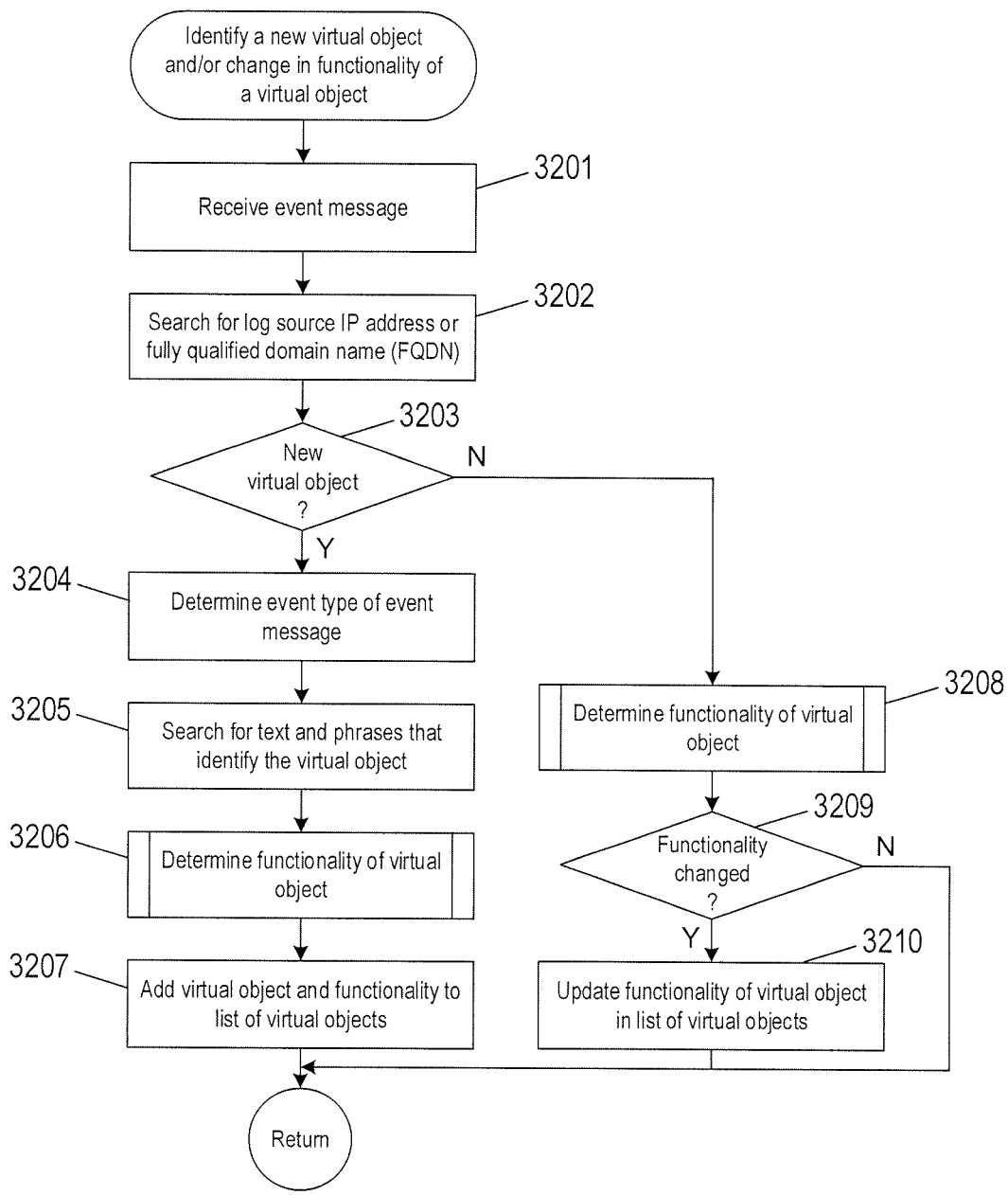
FIG. 32 shows a control flow diagram of the routine "identify a new virtual object and/or change in functionality of a virtual object" called in FIG. 31.

FIG. 32 shows a control flow diagram of the routine "identify a new virtual object and/or change in functionality of a virtual object" called in block 3101 of FIG. 31. In block 3201 an event message is read from an event log as described above with reference to FIGS. 24A-24B. In block 3202, the event message is searched to identify an IP address or FQDN of a virtual object. In decision block 3203, if a new virtual object is identified from the IP address or FQDN as described above with reference to FIG. 19B and FIG. 21, control flows to block 3204. Otherwise, control flows to block 3208. In block 3204, event type of the event message is determined as described above with reference to FIG. 23. In block 3205, text and phrases of the event type are searched to identify the virtual object. In block 3206, a routine "determine functionality of virtual object" is called. In block 3207, the virtual object and functionality of the virtual object is added to the list of virtual objects. In decision block 3208, the routine "determine functionality of virtual object" is called to determine the functionality of identified virtual object. In decision block 3209, if the functionality of the virtual object has changed, control flows to block 3210. In block 3210, the functionality of the virtual object in the list of virtual object is updated.

Figure 33:
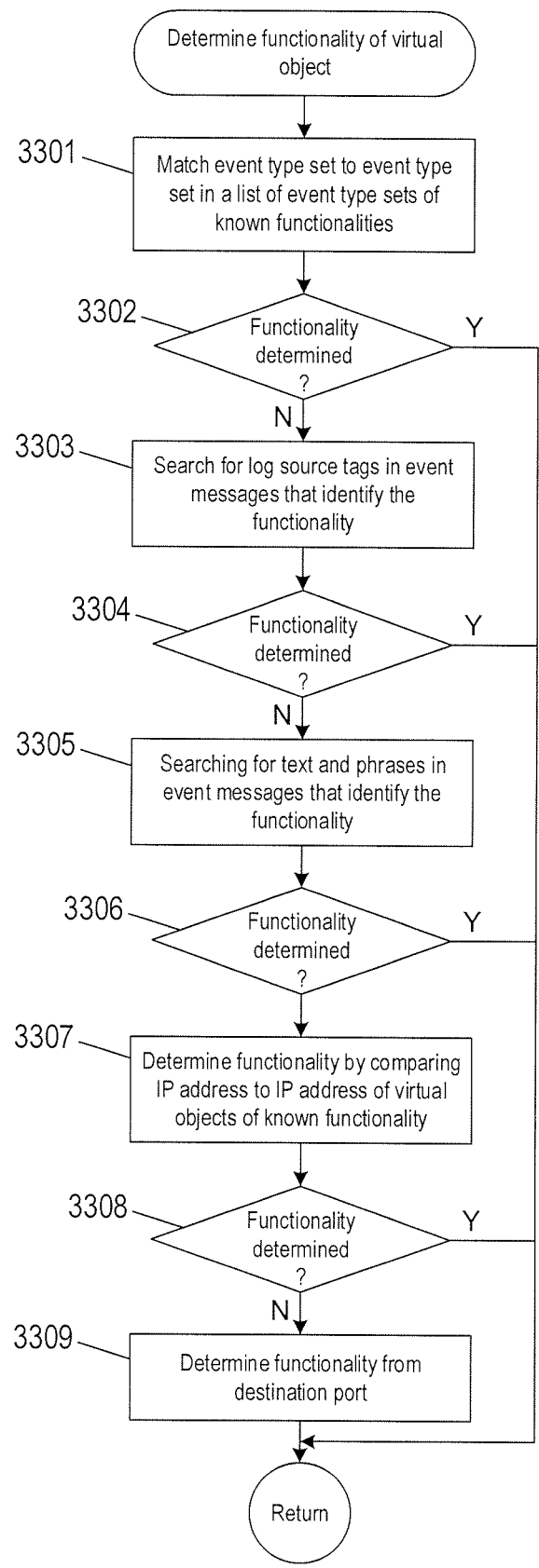
FIG. 33 shows a control flow diagram of the routine "determine functionality of virtual object" called in FIG. 32.

FIG. 33 shows a control flow diagram of the routine "determine functionality of virtual object" called in block 3205 of FIG. 32. In block 3301, an event type set produced by a virtual object is matched to an event type set in a list of event type sets of know functionality. In decision block 3303, if a functionality is not determined for the set of event types, control flows to block 3303. In block 3303, log source tags are compared with log source tags of known functionality. In decision block 3304, if a functionality is not determined from the source tags, control flows to block 3305. In block 3305, functionality of the virtual object may be determined from text and phrases of event messages. In decision block 3306, if a functionality is not determined from text and phrases of the event message, control flows to block 3307. In block 3307, the functionality is determined by comparing the IP address of the virtual object to the IP address of virtual objects with known functionalities. The functionality of the virtual object of known functionalities with the closest IP address is assigned to the virtual object. In decision block 3308, if a functionality is not determined by comparing the IP address with IP addresses of virtual object of know functionality, control flows to block 3307. In block 3309, destination ports, such as TCP, UDP, and SCTP ports, that provide functionality information are determined. Note that in other implementations, any two or more of the operations represented by blocks 3301, 3303, 3305, 3307, and 3309 may be used to confirm the functionality of a virtual object. For example, when the functionality determined from block 3301 matches the functionality determined from block 3303, the virtual object is assigned the functionality determined from both blocks. Additional steps based on confidence in results may be used. For example, a functionality determined from blocks 3301 and 3303 have a higher confidence than the functionalities determined in blocks 3305 and 3307.

Figure 34:
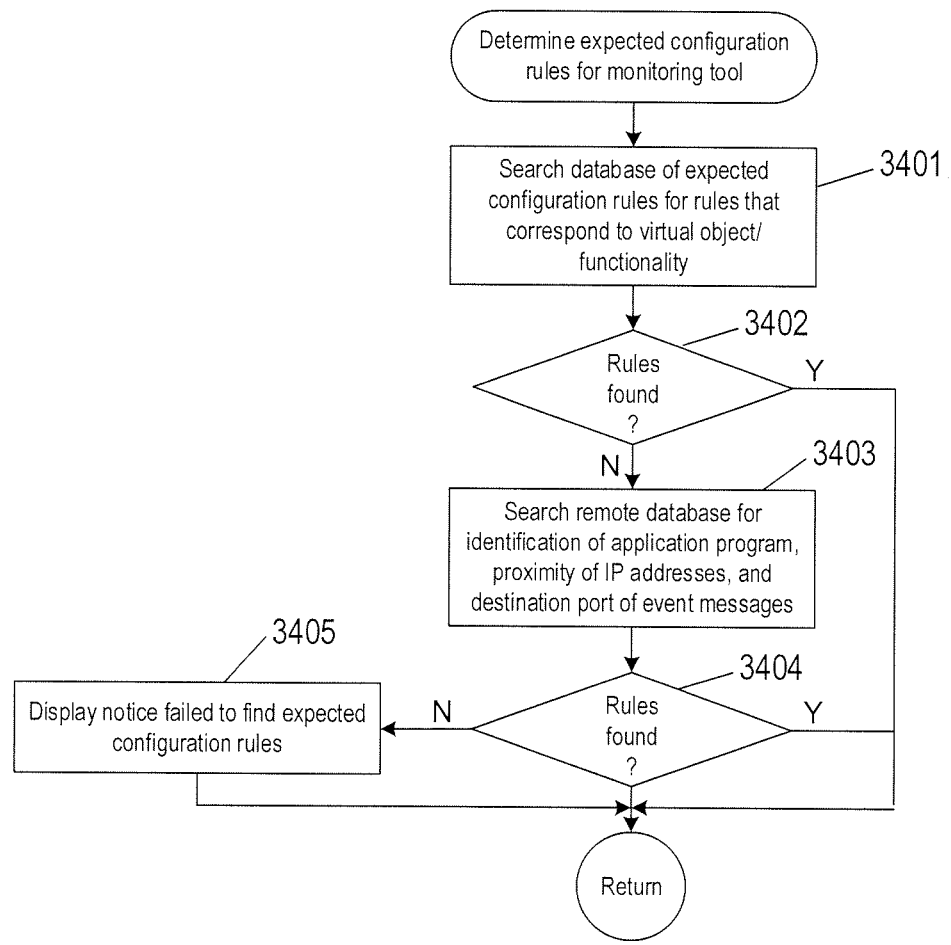
FIG. 34 shows a control flow diagram of the routine "determine expected configuration rules for monitoring tool" called in FIG. 31.

FIG. 34 shows a control flow diagram of the routine "determine expected configuration rules for monitoring tool" called in block 3103 of FIG. 31. In block 3401, a database of expected configuration rules is searched for rules that correspond to the virtual object or functionality as described above with reference to FIG. 25. In decision block 3402, if rules are not found, control flows to block 3403. In block 3403, a remoted database is search for application program information, proximity of the IP address to the virtual object to the IP addresses virtual objects known expected configuration rules, and based on destination ports of log source where client connects to the virtual object. The expected configuration rules of a virtual objects that satisfies any one of these conditions can be used as the expected configuration rule of the virtual object. In decision block 3404, if rules are not found, control flows to block 3405. In block 3405, a notice is displayed on the virtual-data-center management interface.

Figure 35:
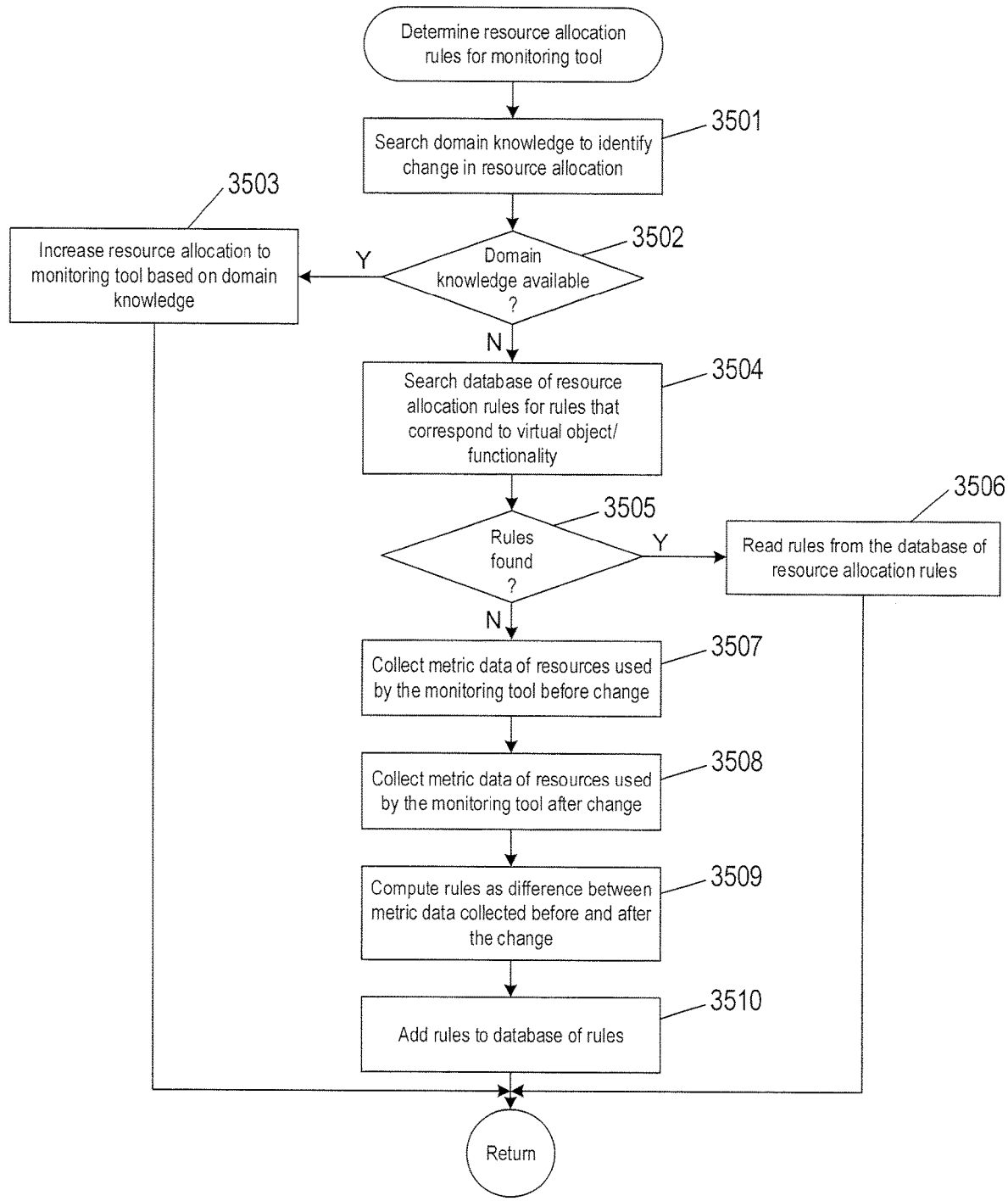
FIG. 35 shows a control flow diagram of the routine "determine resource allocation rules for monitoring tool" called in FIG. 31.

FIG. 35 shows a control flow diagram of the routine "determine resource allocation rules for monitoring tool" called in block 3104 of FIG. 31. In block 3501, the monitoring tool 1902 searches domain knowledge maintained by the monitoring tool 1902 identify resource allocation for the increase in event messages and/or name of application program. In decision block 3502, if the domain knowledge is available, control flow to block 3503. In block 3503, resource allocation is increased according to the domain knowledge. In block 3504, a database of resource allocation rules is searched for rules that correspond to the virtual object and/or functionality, as described above with reference to FIG. 26. In decision block 3505, when rules are obtained from the database of rules, control flows to block 3503. In block 3506, the rules are read from the database of resource allocation rules and returned. In block 3507, metric data associated with infrastructure resources used by the monitoring tool 1902 before the change are collected as described above with reference to FIG. 29. In block 3508, metric data associated with infrastructure resources used by the monitoring tool 1902 after the change are collected as described above with reference to FIG. 29. In block 3509, rules are computed based on the metric data collected before and after the change as described above with reference to Equation (8). In block 3507, the rules are added to the resource allocation rules.

Figure 36:
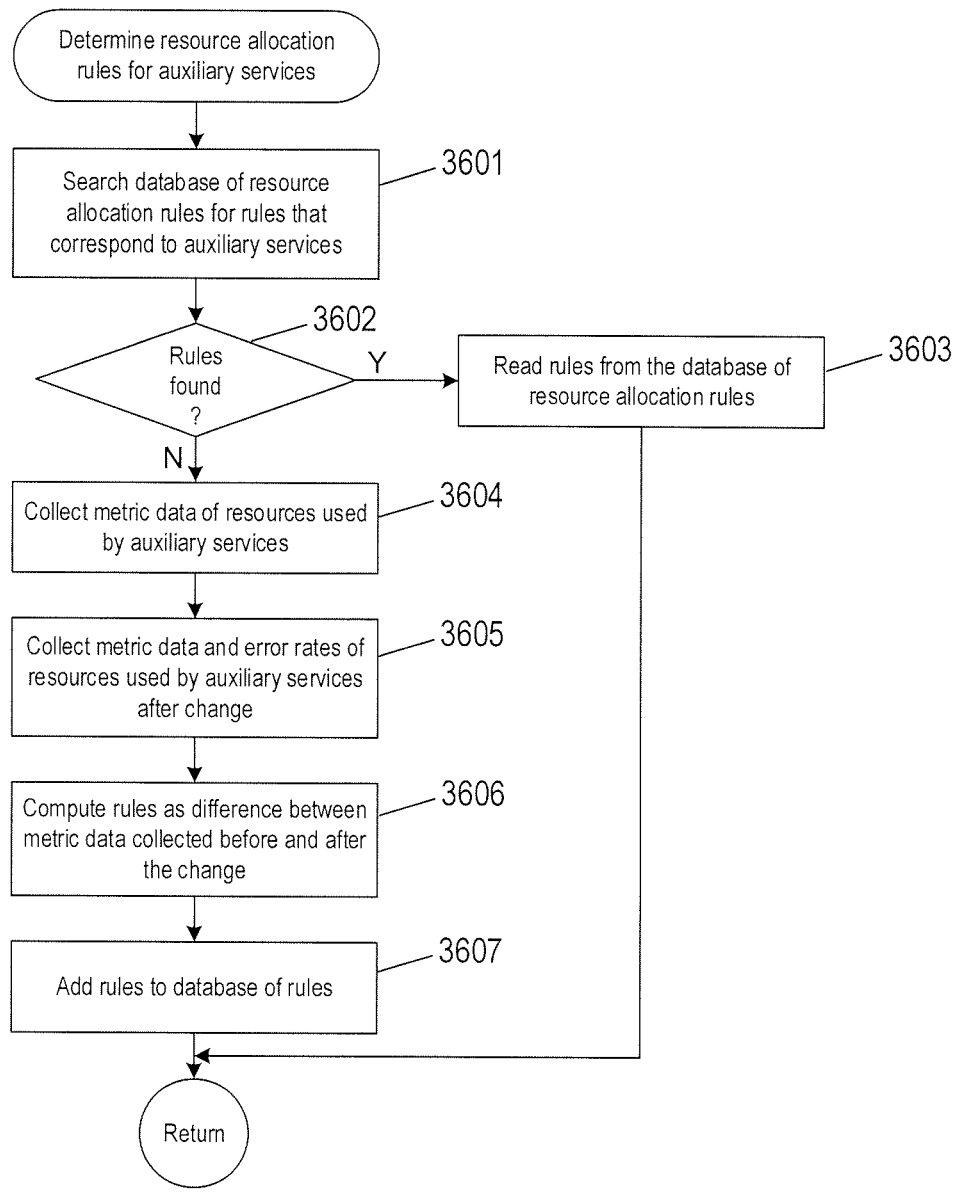
FIG. 36 shows a control flow diagram of the routine "determine resource allocation rules for auxiliary services" called in FIG. 31.

FIG. 36 shows a control flow diagram of the routine "determine resource allocation rules for auxiliary services" called in block 3105 of FIG. 31. In block 3601, a database of resource allocation rules is searched for rules that correspond to the auxiliary services as described above. In decision block 3602, when rules are obtained from the database of rules, control flows to block 3603. In block 3603, the rules are read from the database of resource allocation rules and returned. In block 3604, metric data associated with infrastructure resources used by the auxiliary services before the change are collected, as described above with reference to FIG. 29. In block 3605, metric data associated with infrastructure resources used by the auxiliary services after the change are collected, as described above with reference to FIG. 29. In block 3606, rules are computed based on the metric data collected before and after the change as described above with reference to Equation (8). In block 3607, the rules are added to the resource allocation rules.

Figure 37:
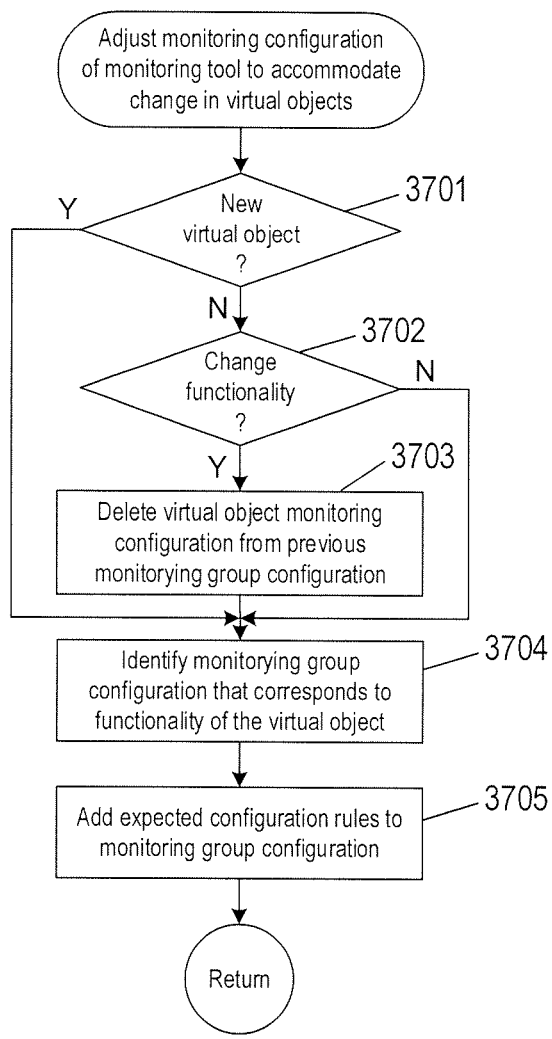
FIG. 37 shows a control flow diagram of the routine "adjust monitoring configuration of monitoring tool to accommodate change in virtual object" called in FIG. 31.

FIG. 37 shows a control flow diagram of the routine "adjust monitoring configuration of monitoring tool to accommodate change in virtual object" called in block 3106 of FIG. 31. In decision block 3701, if the virtual object is a new virtual object, control flows to block 3704. Otherwise, in decision block 3702, when there has been a change in functionality of to the virtual object, control flow to block 3703. In block 3703, the monitoring group configuration associated with the virtual object is deleted from the previous monitoring group configuration, as described above with reference to FIGS. 27A-27B. In block 3704, the monitoring group configuration that corresponds to the functionality of the virtual object is identified. In block 3705, the expected configuration rules are added to the monitoring group configuration.

Figure 38:
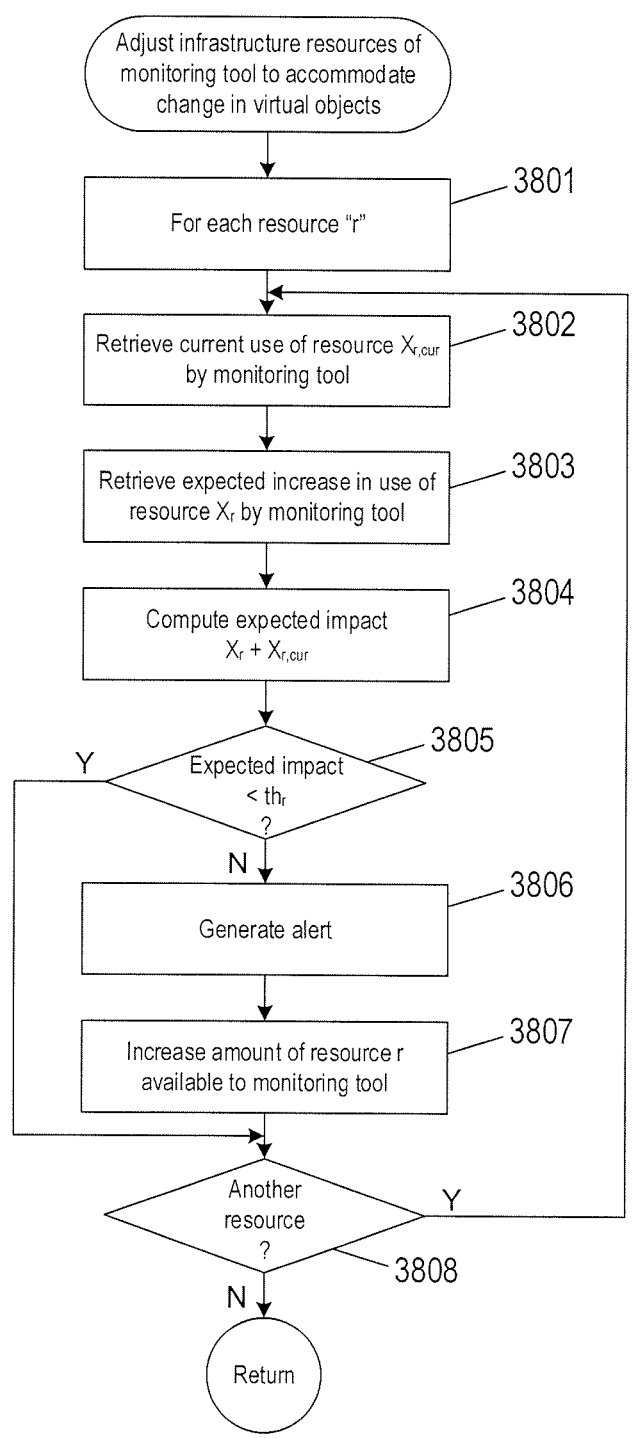
FIG. 38 shows a control flow diagram of the routine "adjust infrastructure resources of the monitoring tool to accommodate change in virtual objects" called in FIG. 31.

FIG. 38 shows a control flow diagram of the routine "adjust infrastructure resources of the monitoring tool to accommodate change in virtual objects" called in block 3107 of FIG. 31. A loop beginning with block 3801 repeats the operations represented by blocks 3802-3806 for each resource used by the monitoring tool 1902. In block 3802, the current use of a resource, $X_{r,cur}$, is determined from the monitoring tool 1902. In block 3803, an expected increase in use of a resource, $X_r$, is retrieved from resource allocation rules. In block 3804, an expected impact is computed as described above with reference to Equation (1). In decision block 3805, when the expected impact does not satisfy the condition of Equation (2), control flows to block 3806. In block 3806, an alert is generated on the administrative console. In block 3807, the amount of the resource used by the monitoring tool 1902 is increased. In decision block 3808, the operations of blocks 3802-3807 are repeated for another resource used by the monitoring tool 1902.

Figure 39:
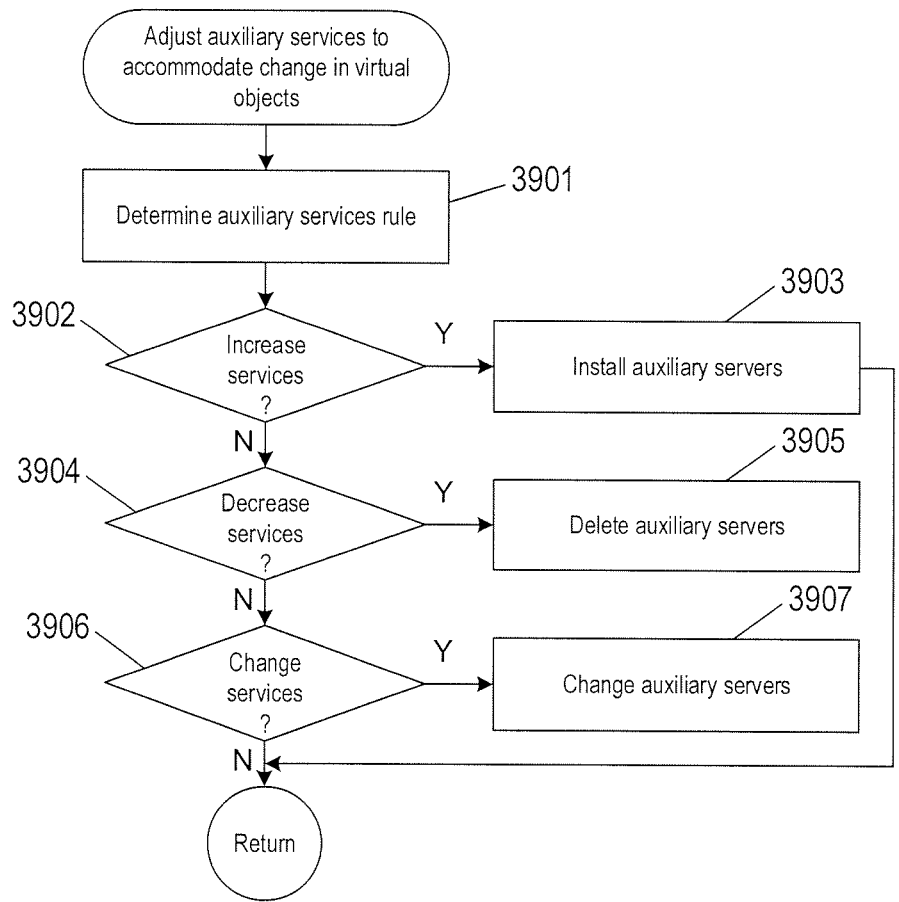
FIG. 39 shows a control flow diagram the routine "adjust auxiliary services to accommodate change in virtual objects" called in block 3108 of FIG. 31.

FIG. 39 shows a control flow diagram the routine "adjust auxiliary services to accommodate change in virtual objects" called in block 3108 of FIG. 31. In block 3901, an auxiliary service rule is determined for the auxiliary services used by the virtual object. In decision block 3902, when the services increase, control flows to block 3903 and auxiliary services that correspond to the auxiliary services rule are installed in the distributed computing system. In decision block 3904, when the services decrease, control flows to block 3905 and auxiliary services that correspond to the auxiliary services rule are deleted from the distributed computing system. In decision block 3906, when the services change, control flows to block 3907 and auxiliary services that correspond to the rule are changed in the distributed computing system.

Figure 40:
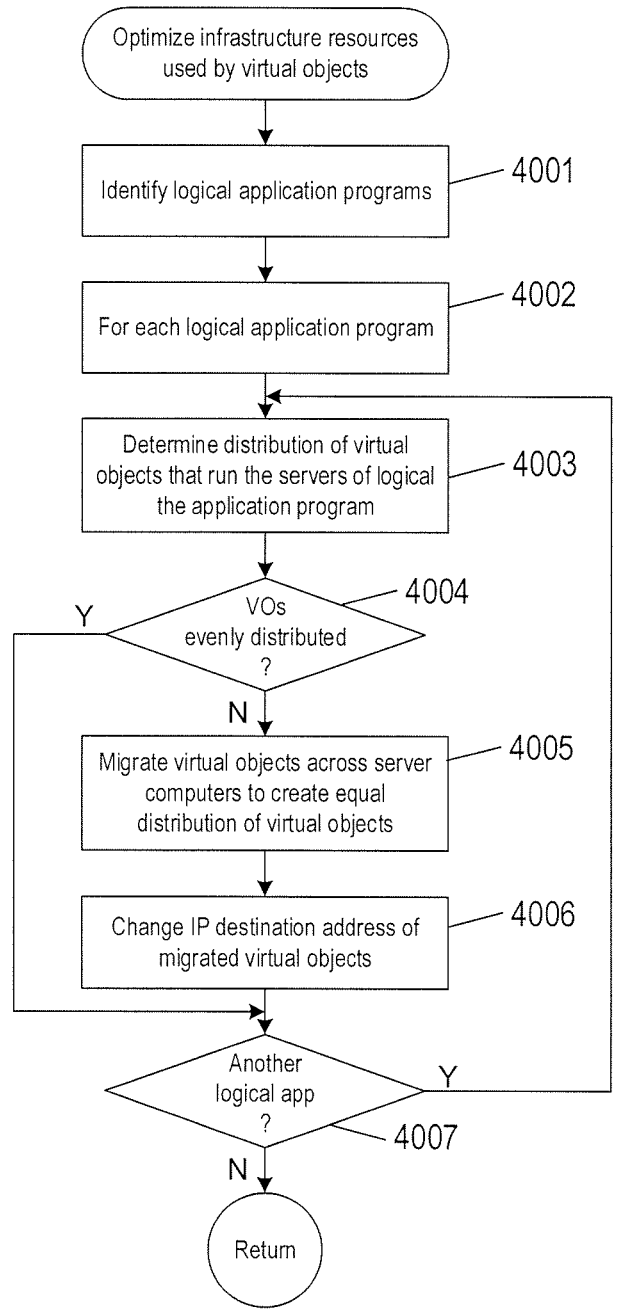
FIG. 40 shows a control flow diagram of the routine "optimize infrastructure resources used by virtual objects" called in FIG. 31.

FIG. 40 shows a control flow diagram of the routine "optimize infrastructure resources used by virtual objects" called in block 3107 of FIG. 31. In block 4001, logical application programs are identified. A loop beginning with block 4002 repeats the operations represented by blocks 4003-4007. In block 4003, the distribution of virtual objects that run the servers of the logical application is determined. In decision block 4004, if the virtual objects are not disturbed, control flows to block 4005. In block 4005, virtual objects are migrated to server computers to create an equal distribution of virtual objects. In block 4006, destination IP addresses of migrated virtual objects are changed as described above with reference to FIG. 30. In decision block 4007, if another logical application is identified, control flows block 4003.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a management server computer of a distributed computing system to adjust a monitoring tool hosted by the management server computer and auxiliary services of the distributed computing system, the method comprising:
    identifying a virtual object of the distributed computing system, wherein the virtual object is a new virtual object installed on the distributed computing system or functionality of the virtual object has changed;
    determining a change in demand for the auxiliary services used by the virtual object, the change determined by the monitoring tool;
    determining rules for adjusting the monitoring tool based on at least one of the virtual object being new, the changed functionality of the virtual object, and the change in demand for the auxiliary services;
    adjusting at least one of allocation of infrastructure resources to the monitoring tool and monitoring configuration of the monitoring tool in accordance with the rules; and
    adjusting the auxiliary services of the distributed computing system based on the change in demand for the auxiliary services used by the virtual object, as determined by the monitoring tool.

2. The method of claim 1 wherein identifying the virtual object comprises comparing a current list of virtual objects of the distributed computing system with a previous list of virtual objects of the distributed computing system, the virtual object appearing on the current list of virtual object and not appearing on the previous list of virtual objects.

3. The method of claim 1 wherein identifying the virtual object comprises searching event messages for text or phrases that identify the virtual object as a new virtual object installed on the distributed computing system.

4. The method of claim 1 wherein identifying the virtual object further comprises performing one or more of the following:
- matching event type set of virtual object to event type set in a list of event type sets of virtual object of known functionality;
- searching event messages of the virtual object for log source tags that identify functionality of the virtual object;
- searching event messages for text and phrases that correspond to the functionality of the virtual object;
- comparing internet protocol address of the virtual object with internet protocol addresses of virtual objects of known functionality;
- determining functionality from a destination port of the virtual object; and
- assigning the functionality to the virtual object as the functionality identified from one or more of the event type set, log source tag, text and phrases, IP address, and the destination port of the virtual object.

5. The method of claim 1 wherein determining the rules for adjusting the monitoring tool comprises:
- determining expected configuration rules for the monitoring tool based on the functionality of the virtual object;
- determining resource allocation rules for the monitoring tool based on the functionality of the virtual object;
- determining expected configuration rules for the monitoring tool based on the change in demand for auxiliary services; and
- determining resource allocation rules for the monitoring tool based on the change in demand for auxiliary services.

6. The method of claim 5 wherein determining the expected configuration rules comprises searching a database of expected configuration rules for expected configuration rules that match the virtual object and functionality of the virtual object.

7. The method of claim 5 wherein determining the resource allocation rules comprises searching a database of resource allocation rules that matches the virtual object and functionality of the virtual object.

8. The method of claim 5 wherein determining the resource allocation rules for the auxiliary services comprises searching the database of resource allocation rules that matches the auxiliary servers.

9. The method of claim 5 wherein determining the resource allocation rules for the auxiliary services comprises:
- when rules are not available for the auxiliary services,
  - collecting metric data of infrastructure resources used by the auxiliary services before the virtual object;
  - collecting metric data of the infrastructure resources used by the auxiliary services after the virtual object;
  - compute rules as a difference between the metric data collected before and after the virtual object; and
  - storing the rules in a database of resource allocation rules.

10. The method of claim 1 wherein adjusting the infrastructure resources used by the monitoring tool comprises:
- generating an alert identifying the one or more infrastructure resources that are expected to be impacted based on the resource allocation rules; and
- scaling up or down infrastructure resources available to the monitoring tool based on the resource allocation rules.

11. The method of claim 1 wherein adjusting the monitoring configuration of the monitoring tool comprises:
- identifying a monitoring group configuration that corresponds to the functionality of the virtual object; and
- adding the expected configuration rules of the virtual object to the monitoring group configuration.

12. The method of claim 1 wherein adjusting the auxiliary services of the distributed computing system comprises:
- when the virtual object creates an increase in demand for auxiliary services, installing auxiliary servers in the distributed computing system in accordance with the auxiliary service rules;
- when the virtual object creates a decrease in demand for auxiliary services, deleting auxiliary servers in the distributed computer in accordance with the auxiliary service rules; and
- when the virtual object creates a change in auxiliary services, changing auxiliary servers in the distributed computer in accordance with the auxiliary service rules.

13. The method of claim 1 further comprises:
- identifying a logical application program with different functionalities in multiple virtual objects distributed on multiple server computers of the distributed computing system;
- determining the functionalities of the virtual objects on each of the multiple server computers;
- if the functionalities are not evenly distributed across the multiple server computers, migrating the virtual objects to create an equal distribution of functionalities of the virtual objects on the multiple server computers; and
- dynamically changing internet protocol destination address of the migrated virtual objects.

14. A system to adjust resources and monitoring configuration of a monitoring tool and auxiliary services of a distributed computing system, the system comprising:
- one or more processors;
- one or more data-storage devices; and
- machine-readable instructions stored in the one or more data-storage devices that when executed using the one or more processors controls the system to perform operations comprising:
  - identifying a virtual object of the distributed computing system, wherein the virtual object is a new virtual object installed on the distributed computing system or functionality of the virtual object has changed;
  - determining a change in demand for the auxiliary services used by the virtual object, the change determined by the monitoring tool;
  - determining rules for adjusting the monitoring tool based on at least one of the virtual object being new, the changed functionality of the virtual object, and the change in demand for the auxiliary services;
  - adjusting at least one of allocation of infrastructure resources to the monitoring tool and monitoring configuration of the monitoring tool in accordance with the rules; and
  - adjusting the auxiliary services of the distributed computing system based on the change in demand for the auxiliary services used by the virtual object, as determined by the monitoring tool.

15. The system of claim 14 wherein identifying the virtual object comprises comparing a current list of virtual objects of the distributed computing system with a previous list of virtual objects of the distributed computing system, the virtual object appearing on the current list of virtual object and not appearing on the previous list of virtual objects.

16. The system of claim 14 wherein identifying the virtual object comprises searching event messages for text or phrases that identify the virtual object as a new virtual object installed on the distributed computing system.

17. The system of claim 14 wherein identifying the virtual object further comprises performing one or more of the following:
    matching event type set of virtual object to event type set in a list of event type sets of virtual object of known functionality;
    searching event messages of the virtual object for log source tags that identify functionality of the virtual object;
    searching event messages for text and phrases that correspond to the functionality of the virtual object;
    comparing internet protocol address of the virtual object with internet protocol addresses of virtual objects of known functionality;
    determining functionality from a destination port of the virtual object; and
    assigning the functionality to the virtual object as the functionality identified from one or more of the event type set, log source tag, text and phrases, IP address, and the destination port of the virtual object.

18. The system of claim 14 wherein determining the rules for adjusting the monitoring tool comprises:
    determining expected configuration rules for the monitoring tool based on the functionality of the virtual object;
    determining resource allocation rules for the monitoring tool based on the functionality of the virtual object;
    determining expected configuration rules for the monitoring tool based on the change in demand for auxiliary services; and
    determining resource allocation rules for the monitoring tool based on the change in demand for auxiliary services.

19. The system of claim 18 wherein determining the expected configuration rules comprises searching a database of expected configuration rules for expected configuration rules that match the virtual object and functionality of the virtual object.

20. The system of claim 18 wherein determining the resource allocation rules comprises searching a database of resource allocation rules that matches the virtual object and functionality of the virtual object.

21. The system of claim 18 wherein determining the resource allocation rules for the auxiliary services comprises searching the database of resource allocation rules that matches the auxiliary servers.

22. The system of claim 18 wherein determining the resource allocation rules for the auxiliary services comprises:
    when rules are not available for the auxiliary services,
        collecting metric data of infrastructure resources used by the auxiliary services before the virtual object;
        collecting metric data of the infrastructure resources used by the auxiliary services after the virtual object;
        compute rules as a difference between the metric data collected before and after the virtual object; and
        storing the rules in a database of resource allocation rules.

23. The system of claim 14 wherein adjusting the infrastructure resources used by the monitoring tool comprises:
    generating an alert identifying the one or more infrastructure resources that are expected to be impacted based on the resource allocation rules; and
    scaling up or down infrastructure resources available to the monitoring tool based on the resource allocation rules.

24. The system of claim 14 wherein adjusting the monitoring configuration of the monitoring tool comprises:
    identifying a monitoring group configuration that corresponds to the functionality of the virtual object; and
    adding the expected configuration rules of the virtual object to the monitoring group configuration.

25. The system of claim 14 wherein adjusting the auxiliary services of the distributed computing system comprises:
    when the virtual object creates an increase in demand for auxiliary services, installing auxiliary servers in the distributed computing system in accordance with the auxiliary service rules;
    when the virtual object creates a decrease in demand for auxiliary services, deleting auxiliary servers in the distributed computer in accordance with the auxiliary service rules; and
    when the virtual object creates a change in auxiliary services, changing auxiliary servers in the distributed computer in accordance with the auxiliary service rules.

26. The system of claim 14 further comprises:
    identifying a logical application program with different functionalities in multiple virtual objects distributed on multiple server computers of the distributed computing system;
    determining the functionalities of the virtual objects on each of the multiple server computers;
    if the functionalities are not evenly distributed across the multiple server computers, migrating the virtual objects to create an equal distribution of functionalities of the virtual objects on the multiple server computers; and
    dynamically changing internet protocol destination address of the migrated virtual objects.

27. A non-transitory computer-readable medium encoded with machine-readable instructions that implement a method carried out by one or more processors of a computer system for adjusting resources and monitoring configuration of a monitoring tool and auxiliary services of a distributed computing system by performing operations of comprising:
    identifying a virtual object of the distributed computing system, wherein the virtual object is a new virtual object installed on the distributed computing system or functionality of the virtual object has changed;
    determining a change in demand for the auxiliary services used by the virtual object, the change determined by the monitoring tool;
    determining rules for adjusting the monitoring tool based on at least one of the virtual object being new, the changed functionality of the virtual object, and the change in demand for the auxiliary services;
    adjusting at least one of allocation of infrastructure resources to the monitoring tool and monitoring configuration of the monitoring tool in accordance with the rules; and
    adjusting the auxiliary services of the distributed computing system based on the change in demand for the auxiliary services used by the virtual object, as determined by the monitoring tool.

28. The medium of claim 27 wherein identifying the virtual object comprises comparing a current list of virtual objects of the distributed computing system with a previous list of virtual objects of the distributed computing system, the virtual object appearing on the current list of virtual object and not appearing on the previous list of virtual objects.

29. The medium of claim 27 wherein identifying the virtual object comprises searching event messages for text or phrases that identify the virtual object as a new virtual object installed on the distributed computing system.

30. The medium of claim 27 wherein identifying the virtual object further comprises performing one or more of the following:
    matching event type set of virtual object to event type set in a list of event type sets of virtual object of known functionality;
    searching event messages of the virtual object for log source tags that identify functionality of the virtual object;
    searching event messages for text and phrases that correspond to the functionality of the virtual object;
    comparing internet protocol address of the virtual object with internet protocol addresses of virtual objects of known functionality;
    determining functionality from a destination port of the virtual object; and
    assigning the functionality to the virtual object as the functionality identified from one or more of the event type set, log source tag, text and phrases, IP address, and the destination port of the virtual object.

31. The medium of claim 27 wherein determining the rules for adjusting the monitoring tool comprises:
    determining expected configuration rules for the monitoring tool based on the functionality of the virtual object;
    determining resource allocation rules for the monitoring tool based on the functionality of the virtual object;
    determining expected configuration rules for the monitoring tool based on the change in demand for auxiliary services; and
    determining resource allocation rules for the monitoring tool based on the change in demand for auxiliary services.

32. The medium of claim 31 wherein determining the expected configuration rules comprises searching a database of expected configuration rules for expected configuration rules that match the virtual object and functionality of the virtual object.

33. The medium of claim 31 wherein determining the resource allocation rules comprises searching a database of resource allocation rules that matches the virtual object and functionality of the virtual object.

34. The medium of claim 31 wherein determining the resource allocation rules for the auxiliary services comprises searching the database of resource allocation rules that matches the auxiliary servers.

35. The medium of claim 31 wherein determining the resource allocation rules for the auxiliary services comprises:
    when rules are not available for the auxiliary services,
        collecting metric data of infrastructure resources used by the auxiliary services before the virtual object;
        collecting metric data of the infrastructure resources used by the auxiliary services after the virtual object;
        compute rules as a difference between the metric data collected before and after the virtual object; and
        storing the rules in a database of resource allocation rules.

36. The medium of claim 27 wherein adjusting the infrastructure resources used by the monitoring tool comprises:
    generating an alert identifying the one or more infrastructure resources that are expected to be impacted based on the resource allocation rules; and
    scaling up or down infrastructure resources available to the monitoring tool based on the resource allocation rules.

37. The medium of claim 27 wherein adjusting the monitoring configuration of the monitoring tool comprises:
    identifying a monitoring group configuration that corresponds to the functionality of the virtual object; and
    adding the expected configuration rules of the virtual object to the monitoring group configuration.

38. The medium of claim 27 wherein adjusting the auxiliary services of the distributed computing system comprises:
    when the virtual object creates an increase in demand for auxiliary services, installing auxiliary servers in the distributed computing system in accordance with the auxiliary service rules;
    when the virtual object creates a decrease in demand for auxiliary services, deleting auxiliary servers in the distributed computer in accordance with the auxiliary service rules; and
    when the virtual object creates a change in auxiliary services, changing auxiliary servers in the distributed computer in accordance with the auxiliary service rules.

39. The medium of claim 27 further comprises:
    identifying a logical application program with different functionalities in multiple virtual objects distributed on multiple server computers of the distributed computing system;
    determining the functionalities of the virtual objects in on each of the multiple server computers;
    if the functionalities are not evenly distributed across the multiple server computers, migrating the virtual objects to create an equal distribution of functionalities of the virtual objects on the multiple server computers; and
    dynamically changing internet protocol destination address of the migrated virtual objects.

* * * * *